(12) United States Patent
Takano

(10) Patent No.: US 11,284,275 B2
(45) Date of Patent: Mar. 22, 2022

(54) COMMUNICATION APPARATUS AND COMMUNICATION METHOD

(71) Applicant: Sony Corporation, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 60 days.

(21) Appl. No.: 16/635,576

(22) PCT Filed: Jul. 9, 2018

(86) PCT No.: PCT/JP2018/025898
§ 371 (c)(1),
(2) Date: Jan. 31, 2020

(87) PCT Pub. No.: WO2019/031133
PCT Pub. Date: Feb. 14, 2019

(65) Prior Publication Data
US 2020/0245156 A1 Jul. 30, 2020

(30) Foreign Application Priority Data

Aug. 8, 2017 (JP) .............................. JP2017-153538

(51) Int. Cl.
*H04W 16/28* (2009.01)
*H04B 17/336* (2015.01)
*H04B 7/06* (2006.01)

(52) U.S. Cl.
CPC .......... *H04W 16/28* (2013.01); *H04B 7/0617* (2013.01); *H04B 7/0626* (2013.01); *H04B 17/336* (2015.01)

(58) Field of Classification Search
CPC ................. H04W 16/28; H04B 17/336; H04B 7/0617; H04B 7/0626
See application file for complete search history.

(56) References Cited

U.S. PATENT DOCUMENTS

| | | |
|---|---|---|
| 10,356,749 B2 * | 7/2019 | Lee ........................ H04W 68/02 |
| 2017/0207841 A1 * | 7/2017 | Kim ..................... H04W 72/046 |
| 2018/0097556 A1 * | 4/2018 | Nagaraja .............. H04B 7/0617 |
| 2018/0139791 A1 * | 5/2018 | Bai ........................ H04L 7/0079 |
| 2018/0192384 A1 * | 7/2018 | Chou .................. H04W 72/044 |

(Continued)

FOREIGN PATENT DOCUMENTS

| | | |
|---|---|---|
| JP | 2001-053674 A | 2/2001 |
| JP | 2014-527370 A | 10/2014 |

(Continued)

OTHER PUBLICATIONS

Partial Supplementary European Search Report dated Jun. 30, 2020 in European Patent Application No. 18845230.4, 19 pages.

(Continued)

*Primary Examiner* — Jaison Joseph
(74) *Attorney, Agent, or Firm* — Xsensus LLP

(57) ABSTRACT

A communication apparatus includes a control unit that changes, for each of beam groups, setting of scanning for resetting communication with an apparatus. The communication is performed by using a directional beam. The scanning is performed by using the directional beam. The beam groups each include a plurality of the directional beams. The control unit performs allocation of resources to the plurality of beam groups at one time.

25 Claims, 28 Drawing Sheets

(56) References Cited

U.S. PATENT DOCUMENTS

| | | | |
|---|---|---|---|
| 2018/0227899 A1* | 8/2018 | Yu | H04B 7/02 |
| 2019/0058519 A1* | 2/2019 | Davydov | H04L 5/006 |
| 2019/0082334 A1* | 3/2019 | Nagaraja | H04W 72/1226 |
| 2020/0288479 A1* | 9/2020 | Xi | H04B 7/02 |
| 2021/0105171 A1* | 4/2021 | Chen | H04W 72/04 |

FOREIGN PATENT DOCUMENTS

| | | |
|---|---|---|
| JP | 2015-041817 A | 3/2015 |
| JP | 2015-162823 A | 9/2015 |
| WO | 2016/121252 A1 | 8/2016 |

OTHER PUBLICATIONS

Nokia, et al., "Beam Recovery in NR", 3GPP TSG RAN WG1 NR Ad-Hoc Meeting, R1-1701092, Spokane, USA, Jan. 16-20, 2017, XP051202387, 5 pages.

Nokia, et al., "Beam Recovery", 3GPP TSG RAN WG1 NR Ad-Hoc#2, R1-1711291, Qingdao, P.R. China, Jun. 27-30, 2017, XP051304603, 7 pages.

International Search Report and Written Opinion dated Aug. 21, 2018 for PCT/JP2018/025898 filed on Jul. 9, 2018, 15 pages including English Translation of the International Search Report.

Huawei and Hisilicon, "Discussion on beam management aspects for UL MIMO," 3GPP TSG RAN WG1 Meeting No. 87, R1-1611670, Reno, USA, Nov. 14-18, 2016, pp. 1-7.

\* cited by examiner

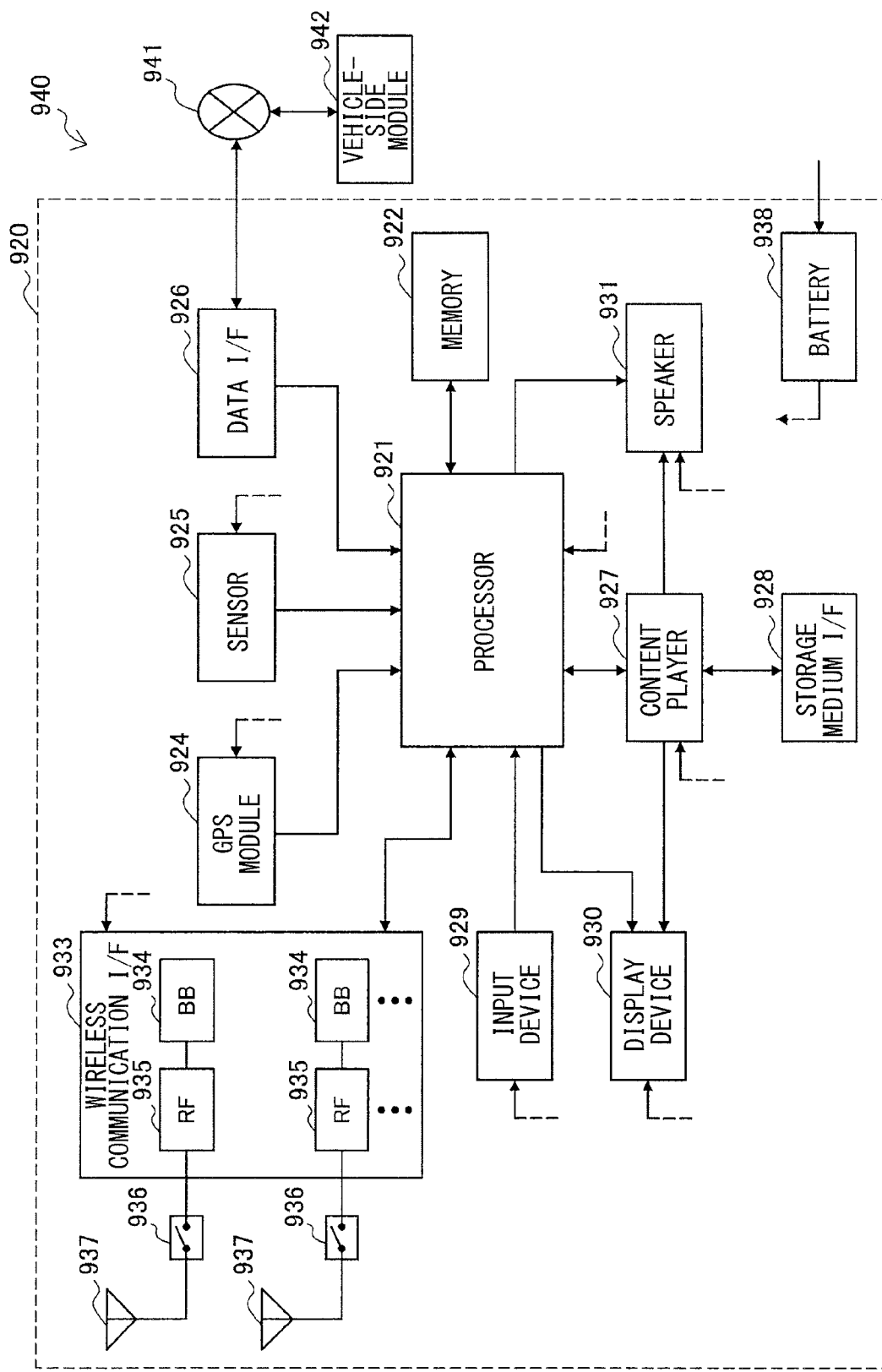

COMMUNICATION APPARATUS AND COMMUNICATION METHOD

CROSS-REFERENCE TO RELATED APPLICATIONS

The present application is based on PCT filing PCT/JP2018/025898, filed Jul. 09, 2018, which claims priority to JP 2017-153538, filed Aug. 08, 2017, the entire contents of each are incorporated herein by reference.

TECHNICAL FIELD

The present disclosure relates to a communication apparatus and a communication method.

BACKGROUND ART

In the 3GPP (Third Generation Partnership Project), various techniques for improving the capacity of a cellular system are currently studied to accommodate explosively increasing traffic. For example, PTL 1 discloses a technique for making it possible to obtain more favorable reception quality in a case where transmission is performed by using a directional beam.

CITATION LIST

Patent Literature

PTL 1: International Publication No. WO 2016/121252

SUMMARY OF THE INVENTION

Problems to be Solved by the Invention

It is desirable to promptly decide a beam suitable for communication when it is no longer possible to perform communication by using a beam in performing transmission by using a directional beam.

Accordingly, the present disclosure proposes a novel and improved communication apparatus and communication method that make it possible to promptly decide a beam suitable for communication when it is no longer possible to perform communication by using a beam while transmission is performed by using a directional beam.

Means for Solving the Problems

According to the present disclosure, there is provided a communication apparatus including a control unit that changes, for each of beam groups, setting of scanning for resetting communication with an apparatus. The communication is performed by using a directional beam. The scanning is performed by using the directional beam. The beam groups each include a plurality of the directional beams. The control unit performs allocation of resources to the plurality of beam groups at one time.

In addition, according to the present disclosure there is provided a communication apparatus including a control unit that changes, for each of beam groups, setting of scanning for resetting communication with an apparatus. The communication is performed by using a directional beam. The scanning is performed by using the directional beam. The beam groups each include a plurality of the directional beams. The control unit performs allocation of resources for reports of the scanning for the resetting from the apparatus at one time.

In addition, according to the present disclosure, there is provided a communication apparatus including a control unit that changes, for each of beam groups, setting of scanning for resetting communication with an apparatus. The communication is performed by using a directional beam. The scanning is performed by using the directional beam. The beam groups each include a plurality of the directional beams. The control unit selects, in the resetting, on the basis of a request from the apparatus, use of a beam group including a directional beam in a direction excluding a direction near the directional beam used for the communication with the apparatus before the resetting or use of a beam group including a directional beam in the direction near the directional beam used for the communication with the apparatus before the resetting.

In addition, according to the present disclosure, there is provided a communication apparatus including a control unit that changes, for each of beam groups, setting of scanning for resetting communication from an apparatus. The communication is performed by using a directional beam. The scanning is performed by using the directional beam. The beam groups each include a plurality of the directional beams. The control unit requests the apparatus in the resetting to perform the resetting using a beam group including a directional beam in a direction excluding a direction near a directional beam used for communication with the apparatus before the resetting.

In addition, according to the present disclosure, there is provided a communication apparatus including a control unit that performs setting of scanning for resetting communication with an apparatus. The communication is performed by using a directional beam. The scanning is performed by using the directional beam. The control unit performs, at one time, allocation of a resource to a beam group including a plurality of the directional beams and allocation of a resource for grasping a channel state of the communication performed by using the directional beam after the resetting.

In addition, according to the present disclosure, there is provided a communication method including changing, by a processor, for each of beam groups, setting of scanning for resetting communication with an apparatus. The communication is performed by using a directional beam. The scanning is performed by using the directional beam. The beam groups each include a plurality of the directional beams. The processor performs allocation of resources to the plurality of beam groups at one time.

In addition, according to the present disclosure, there is provided a communication method including changing, by a processor, for each of beam groups, setting of scanning for resetting communication with an apparatus. The communication is performed by using a directional beam. The scanning is performed by using the directional beam. The beam groups each include a plurality of the directional beams. The processor performs allocation of resources for reports of the scanning for the resetting from the apparatus at one time.

In addition, according to the present disclosure, there is provided a communication method including changing, by a processor, for each of beam groups, setting of scanning for resetting communication with an apparatus. The communication is performed by using a directional beam. The scanning is performed by using the directional beam. The beam groups each include a plurality of the directional beams. The processor selects, in the resetting, on the basis of a request from the apparatus, use of a beam group including a directional beam in a direction excluding a direction near the directional beam used for the communication with the apparatus before the resetting or use of a beam group including a directional beam in the direction near the directional beam used for the communication with the apparatus before the resetting.

In addition, according to the present disclosure, there is provided a communication method including changing, by a processor, for each of beam groups, setting of scanning for resetting communication from an apparatus. The communication is performed by using a directional beam. The scanning is performed by using the directional beam. The beam groups each include a plurality of the directional beams. The processor requests the apparatus in the resetting to perform the resetting using a beam group including a directional beam in a direction excluding a direction near a directional beam used for communication with the apparatus before the resetting.

In addition, according to the present disclosure, there is provided a communication method including performing, by a processor, setting of scanning for resetting communication with an apparatus. The communication is performed by using a directional beam. The scanning is performed by using the directional beam. The processor performs, at one time, allocation of a resource to a beam group including a plurality of the directional beams and allocation of a resource for grasping a channel state of the communication performed by using the directional beam after the resetting.

Effects of the Invention

As described above, according to the present disclosure, it is possible to provide the novel and improved communication apparatus and communication method that make it possible to promptly decide a beam suitable for communication when it is no longer possible to perform communication by using a beam while transmission is performed by using a directional beam.

It should be noted that the above-described effects are not necessarily limitative. Any of the effects indicated in this description or other effects that may be understood from this description may be exerted in addition to the above-described effects or in place of the above-described effects.

BRIEF DESCRIPTION OF DRAWING

FIG. 32 is a block diagram illustrating an example of a schematic configuration of a car navigation apparatus 920 to which the technology according to the present disclosure may be applied.

MODES FOR CARRYING OUT THE INVENTION

Figure 1:
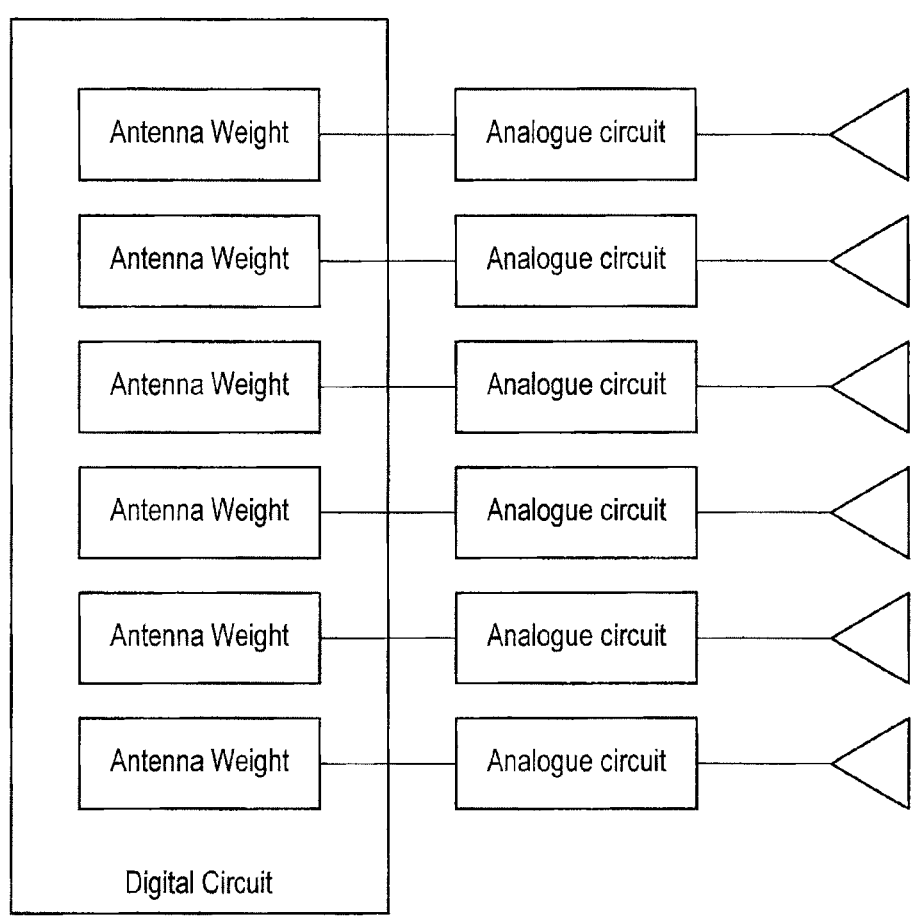
FIG. 1 is an example of a base station in a case where all antenna weights are configured in a digital unit in beam forming.

The following describes a preferred embodiment of the present disclosure in detail with reference to the accompanying drawings. It should be noted that, in this description and the accompanying drawings, components that have substantially the same functional configuration are indicated by the same reference signs, and thus redundant description thereof is omitted.
1. Embodiment of the Present Disclosure
1.1. Background
1.2. Configuration Examples and Operation Examples
2. Application Examples
3. Summary

1. EMBODIMENT OF THE PRESENT DISCLOSURE

[1.1. Background]

First, the background of an embodiment of the present disclosure is described before the embodiment of the present disclosure is described in detail.
(Codebook Based Beam)

As described above, in the 3GPP (Third Generation Partnership Project), various techniques for improving the capacity of a cellular system are studied to accommodate explosively increasing traffic. The future wireless communication system (5G) that is under consideration in the 3GPP is unlikely to offer a mechanism for continuously changing a beam emitted from a base station to remake a beam that follows a terminal. This is because a calculation cost for rebuilding new beams occurs. The FD-MIMO of the 3GPP Rel 13 also adopts a method in which beams are generated in advance that point from a base station in all directions and a beam necessary for the terminal is selected and provided from the beams generated in advance. Such beams are referred to as codebook based beam forming. If a beam is prepared for each of 360 degrees in the horizontal direction, 360 types of beams are required. In a case where halves of beams overlap each other, it is sufficient as codebook based beams in the horizontal direction if 720 beams, which is the double thereof, are prepared. Further, in a case where a beam is prepared for each of 180 degrees in the vertical direction to overlap the halves of the beams with each other, it is possible to prepare 360 beams for 180 degrees from −90 degrees to +90 degrees with the horizontal direction used as 0 degrees.
(Necessity for Beam Association)

It is possible to equip a base station with a considerably large number of antenna elements such as 256 antenna elements (frequency band of 30 GHz) and 1000 antenna elements (frequency band of 70 GHz). In this manner, an increasing number of antenna elements make it possible to produce a very sharp beam in performing a beam forming process by using the antennas. For example, it is possible to provide, for example, very sharp beams in which a half-value width (indicating a minimum degree at which a level where a gain drops by 3 dB) is 1 degree or less from the base station to the terminal.

To communicate between a base station and a terminal, it is necessary to decide what beam is used at the base station. In a case of downlink (DL) communication, it is necessary to decide a DL beam provided from a base station. Further, in a case of uplink (UL) communication, it is necessary to decide a UL beam used by a base station at the time of reception. The latter UL beam does not mean that a base station transmits radio waves, but the directivity of an antenna for the base station to receive the radio waves is a beam.
(Beam Sweeping)

Sweeping (beam sweeping) a plurality of beam candidates from a base station allows a terminal that observes the beam candidates to decide which beam to be used by the base station is easier for that terminal to receive. Meanwhile, when the terminal transmits RS (Reference Signal) of UL and the base station receives the RS while performing beam sweeping, the base station is able to decide an optimal reception beam for receiving signals from the terminal.
(Resource for Beam Forming)

FIG. 1 is an example of a base station in a case where all antenna weights are configured in a digital unit in beam forming. In this manner, a case where all the antenna weights in beam forming are configured in the digital unit is referred to as full digital antenna architecture. In a case of full digital, Tx Sweeping (transmission sweeping) requires as many different resources as beams. Meanwhile, when Rx Sweeping (reception sweeping) is performed, it is possible to concurrently receive all beams within one resource. The full digital antenna architecture thus makes it possible to reduce resources at the time of reception sweeping. That is, when full digital reception sweeping is performed in a base station, it is sufficient if a terminal transmits RS (Resource Signal) of UL for one resource, resulting in less power consumption. The resource here refers to an orthogonal resource using frequency or time. For example, the Resource Block and Resource element of LTE correspond to resources here.

Figure 2:
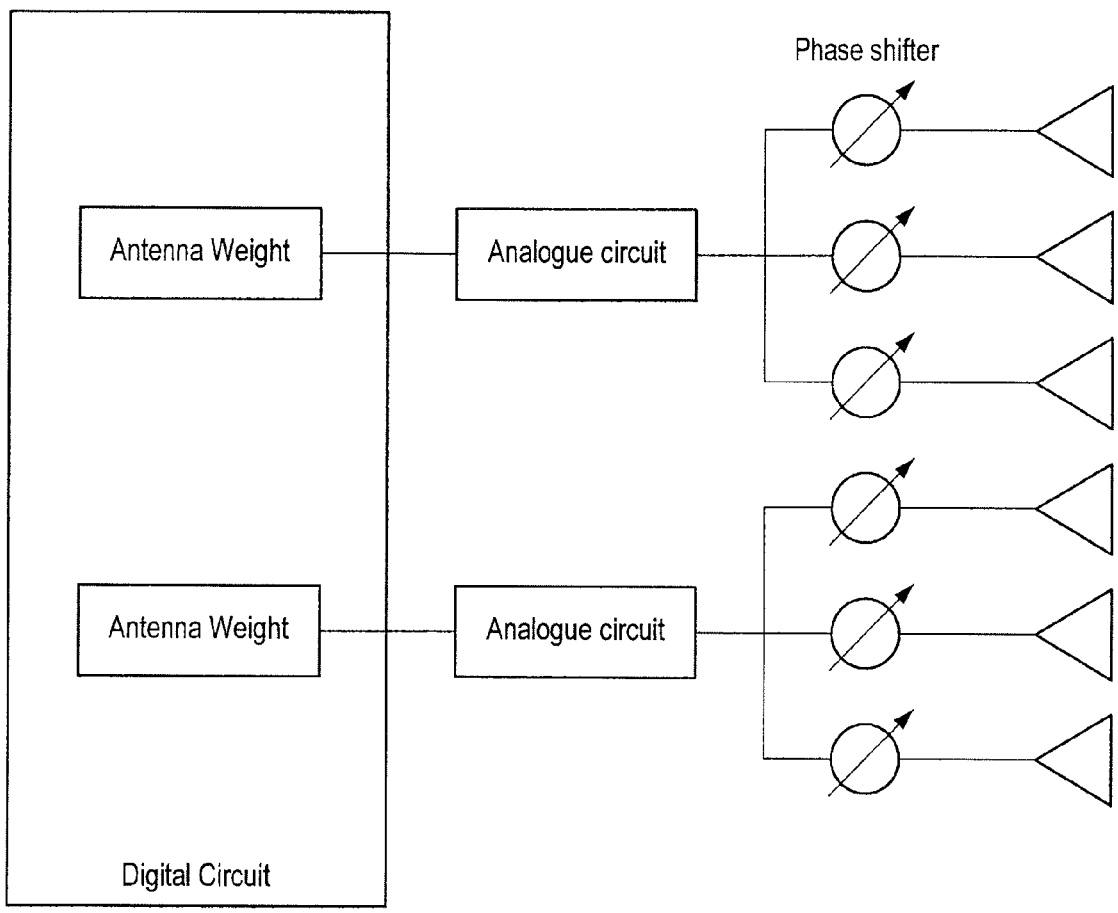
FIG. 2 is an example of a base station including a Phase shifter of an analogue unit in beam forming.

FIG. 2 is an example of a base station including a Phase shifter of an analogue unit in beam forming. In a case where beam forming is achieved to include the Phase shifter of the analogue unit, the beam forming is referred to as digital-analogue hybrid antenna architecture. The digital-analogue hybrid antenna architecture of FIG. 2 is advantageous in terms of cost because of less hardware of the digital unit. However, in this hybrid antenna architecture, a Phase Shifter coupled to an antenna is able to express only a beam in one direction, and transmission sweeping and reception sweeping thus require as many resources as beams. This means that the terminal needs to transmit RSs of UL for all the resources corresponding to the number of beams for reception sweeping of the base station. In other words, the terminal remarkably consumes power.

If the actual use situation is taken into consideration, it is assumed that the hybrid architecture illustrated in FIG. 2 is used. Accordingly, it becomes important how to overcome the drawback of the hybrid architecture, that is, the drawback of different beams needing different frequency or time resources.
(More Efficient Beam Sweeping)

In a case where a beam is prepared for each degree of the 360-degree direction in the horizontal direction, performing beam sweeping by using 360 resources and evaluating each beam take much time and also require a large number of resources. Further, the terminal also consumes more power.

Figure 3:
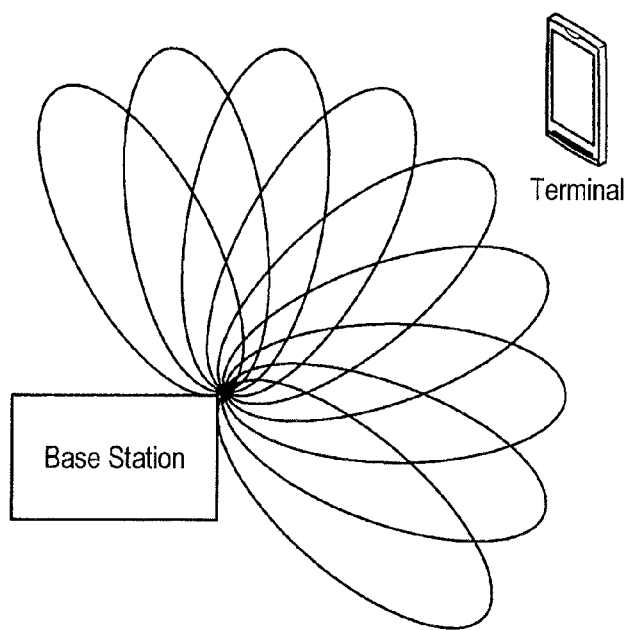
FIG. 3 is an explanatory diagram illustrating an example of beam sweeping using a Rough Beam.
Figure 4:
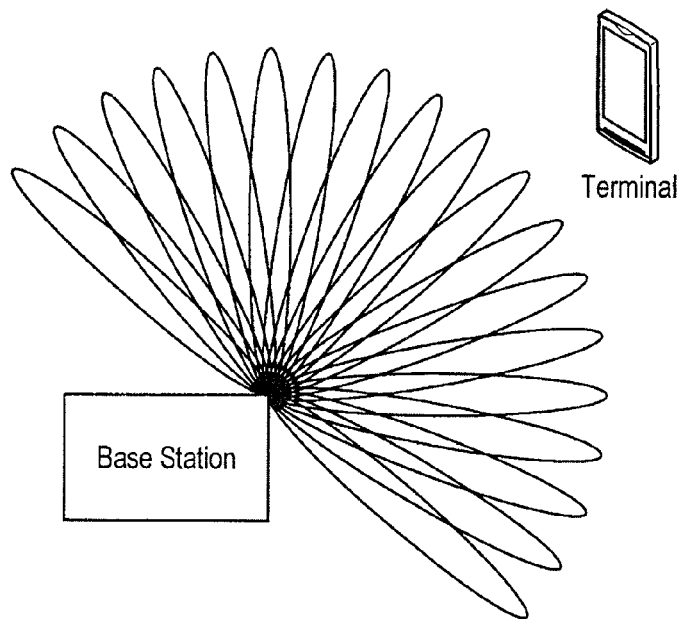
FIG. 4 is an explanatory diagram illustrating an example of beam sweeping using an Accurate Beam.
Figure 5:
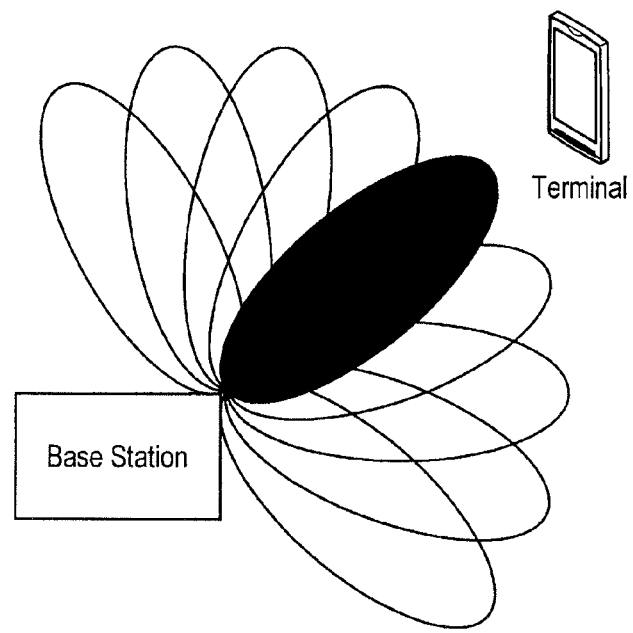
FIG. 5 is an explanatory diagram illustrating an example of the beam sweeping using the Rough Beam.
Figure 6:
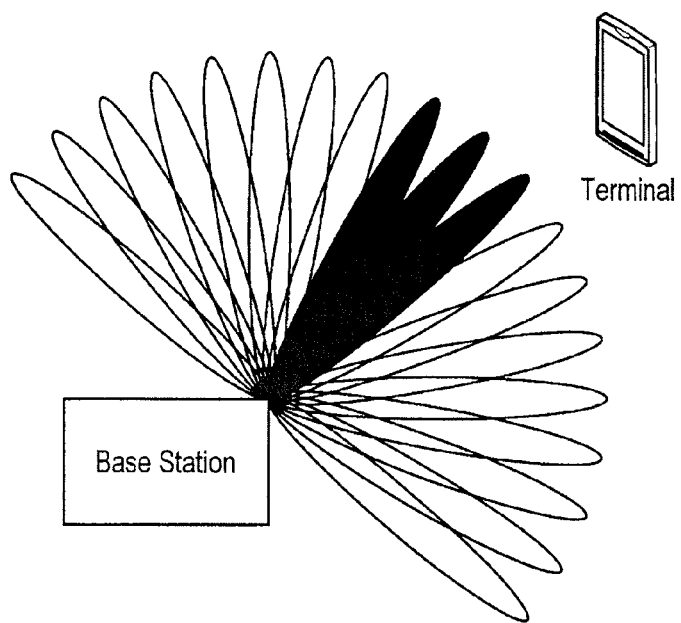
FIG. 6 is an explanatory diagram illustrating an example in which Accurate Beams are bundled to produce a Rough Beam.

Therefore, technology is considered of causing a base station to produce a 10-degree rough beam (Rough Beam), finding an optimal beam among beams having a resolution of 10 degrees by using 36 resources, and then performing beam sweeping by using a fine beam (Accurate Beam) of 1 degree within the range of 10 degrees to find an optimal beam. In this case, the use of 36+10=46 resources allows the base station to decide the optimal beam, and it is thus possible to considerably reduce 360 resources to 46 resources. FIG. 3 is an explanatory diagram illustrating an example of beam sweeping using a Rough Beam. In addition, FIG. 4 is an explanatory diagram illustrating an example of beam sweeping using an Accurate Beam. A base station may bundle a plurality of Accurate Beams and concurrently use the Accurate Beams to treat them as a Rough beam. In this case, for example, a plurality (e.g., three) of adjacent Accurate Beams is concurrently used as a Rough beam. The base station may provide a bundle of three Accurate Beam as illustrated in FIG. 6 to produce a Rough Beam illustrated in FIG. 5. These three beams of FIG. 6 make it possible to provide a Rough beam similar to that of FIG. 5 by being transmitted at the same frequency at the same time.

(Beam Sweeping from Plurality of Base Stations)

Figure 7:
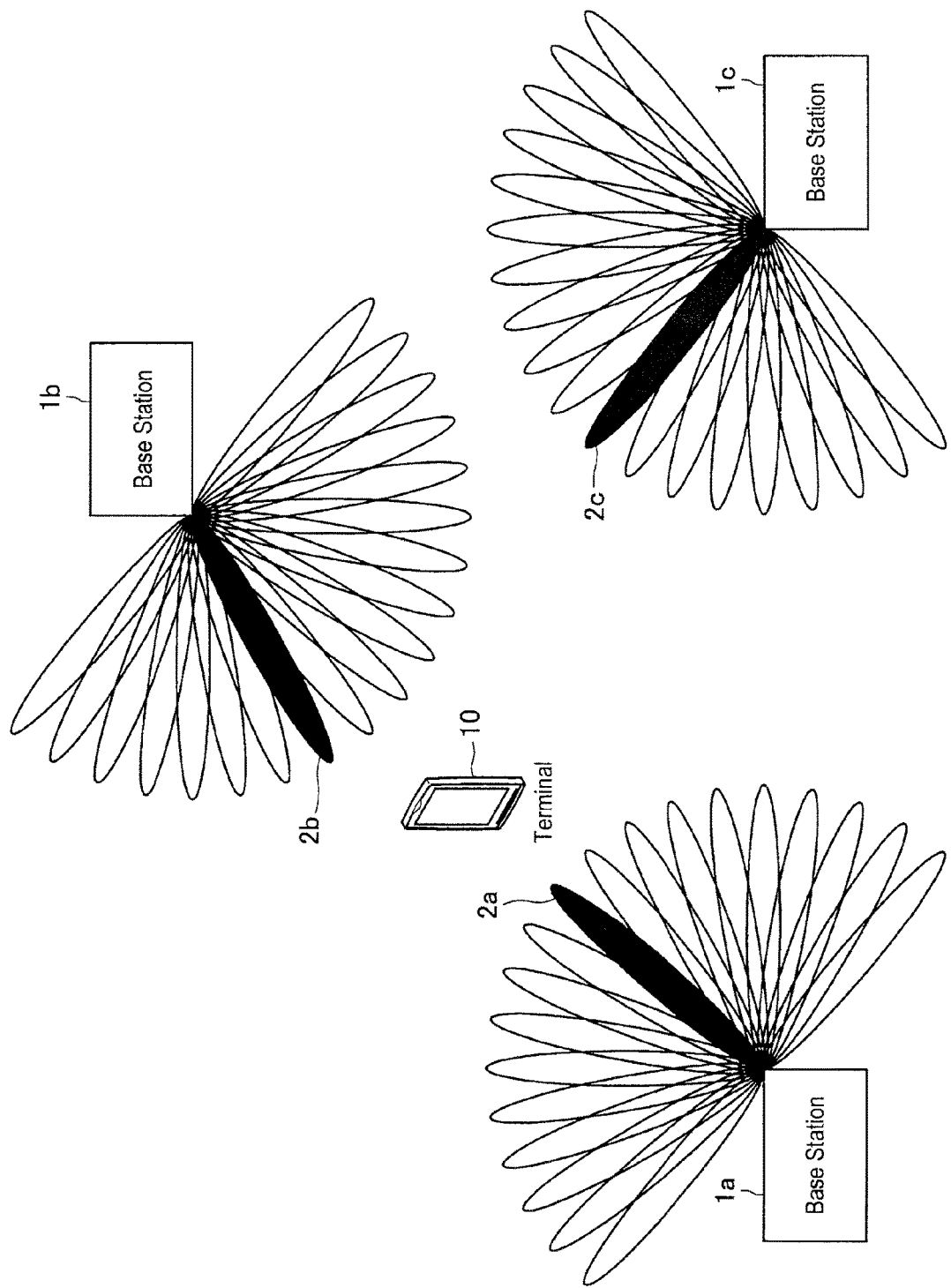
FIG. 7 is an explanatory diagram illustrating an example of a case where a plurality of base stations exists around a terminal.

In a case where a plurality of base stations exists around the terminal, it is necessary to decide the transmission beams and reception beams of the plurality of base stations for the terminal. FIG. 7 is an explanatory diagram illustrating an example of a case where a plurality of base stations exists around a terminal. In the example illustrated in FIG. 7, the optimal beam for the terminal 10 is a beam 2a at a base station 1a, a beam 2b at a base station 1b, and a beam 2c at a base station 1c. A method is conceivable in which the base station that is the closest of the plurality of base stations 1a to 1c to the terminal 10 or the main base station finally decides the optimal beam on the basis of information from the terminal 10, and instructs the other base stations. In this case, one certain base station needs to decide the respective transmission beams and reception beams of a plurality of base stations, resulting in the increased burden on the terminal.

(Channel Reciprocity)

Channel Reciprocity means that the UL channel and the DL channel between the base station and the terminal are the same. In a TDD (Time Division Duplex) system, the UL and the DL use the same frequency band, and thus the Channel Reciprocity of the UL and the DL basically holds. However, it is necessary to perform an operation called calibration to cause the TX/RX of the respective analogue units of the base station and the terminal to have the same characteristics, and establish Reciprocity in both the analogue unit of the terminal and the spatial channel.

When this Channel Reciprocity holds and the terminal selects a DL beam of the base station, the terminal informs the base station of the number of that beam to make it possible to decide the UL beam to be used by the base station without the operation of reception sweeping. The combination of the Rough beam and the Accurate beam mentioned (More Efficient Beam Sweeping) above is as follows.

(DL Beam Sweeping Procedure)

Figure 8:
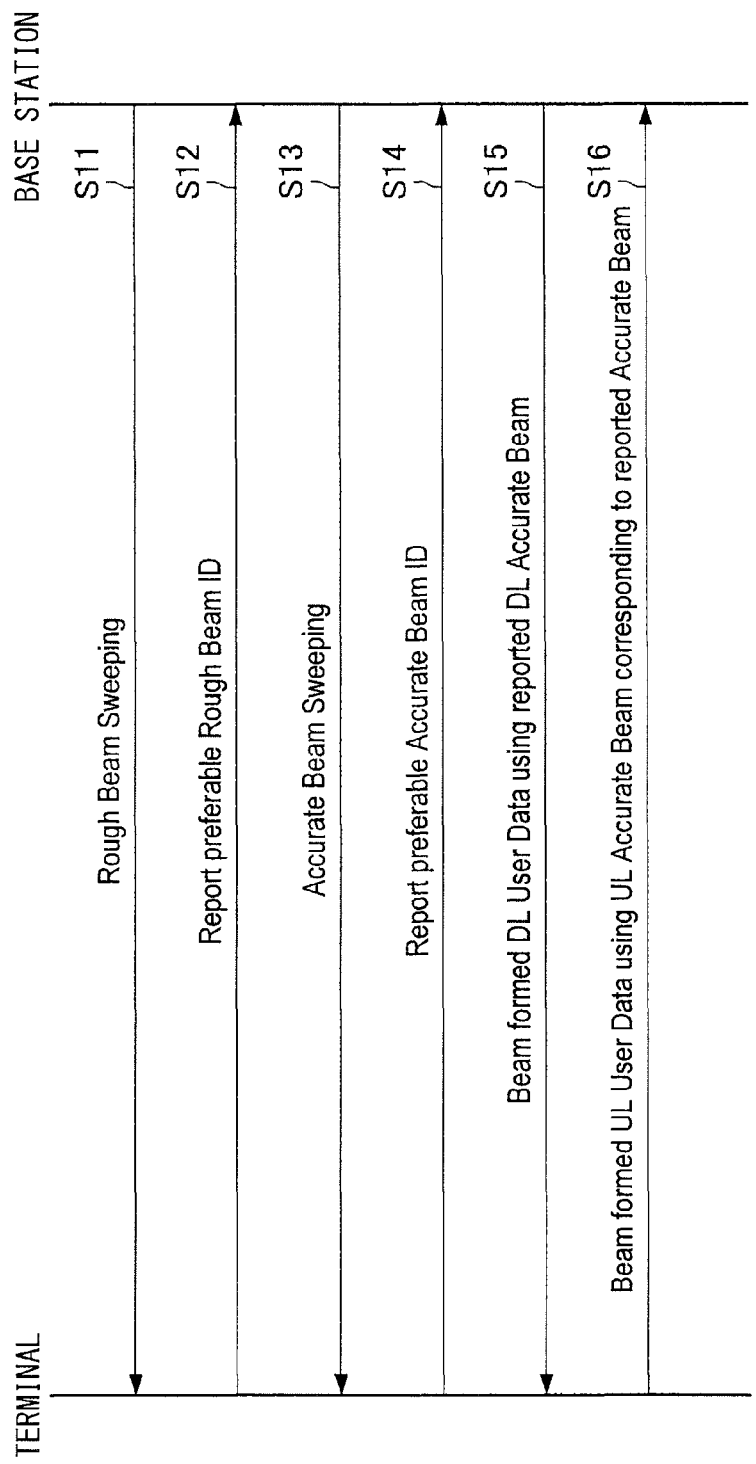
FIG. 8 is an explanatory diagram illustrating an example of a beam sweeping procedure of DL by a base station and a terminal.

FIG. 8 is an explanatory diagram illustrating an example of a beam sweeping procedure of DL by a base station and a terminal. First, a base station performs transmission sweeping on a terminal by using a Rough beam (step S11). This transmission sweeping is performed in a sweeping pattern specific to the base station. In other words, the transmission sweeping is also referred to as Base Station-specific or Cell Specific.

The terminal reports the number of the Rough beam desired for the own apparatus to the base station (step S12). In deciding the desired Rough beam, the terminal decides the desired Rough beam in accordance with whether or not the beam has the highest received power.

When the base station receives the report of the number of the Rough beam from the terminal, the base station performs transmission sweeping using the Accurate Beam corresponding to the Rough beam (step S13). The transmission sweeping at this time may have a sweeping pattern specific to the terminal prepared for the terminal. Alternatively, although a common sweeping pattern is prepared for all terminals, the base station may issue a notification about which portion is monitored for each terminal. In the former case, the pattern of the transmission sweeping itself is specific to the terminal (UE Specific). In the latter case, it is possible to regard the setting of the pattern of the transmission sweeping to be specific to the terminal (UE Specific).

The terminal reports the number of the Accurate beam desired for the own apparatus to the base station (step S14). In deciding the desired Accurate beam, the terminal decides the desired Rough beam in accordance with whether or not the beam has the highest received power.

When the base station receives the report of the number of the Accurate beam from the terminal, the base station transmits DL user data for the terminal by using the Accurate beam (step S15). In a case where the Channel Reciprocity is secured, the base station then receives the UL user data from the terminal by using the same Accurate beam as the Accurate beam at the time of the transmission for reception from the terminal (step S16).

(CQI (Channel Quality Information) acquisition)

When the beam sweeping procedure described above is completed, it is possible to decide the optimal base-station-side transmission beam to be used between the base station and the terminal. It is DL CQI acquisition that is used to grasp the quality and interference condition of the channel at the time of the use of the decided transmission beam. The DL CQI acquisition is necessary to notify the base station from the terminal through feedback using UL called CQI (Channel Quality Indicator) feedback of what type of modulation scheme and coding rate the terminal side wishes to use to cause the base station to perform DL Data Transmission. To perform this feedback, a DL reference signal is transmitted from the base station to the terminal side for DL CQI acquisition, and the DL reference signal for the DL CQI acquisition is received to evaluate the condition of the channel This allows the terminal to decide the desired CQI (combination of a modulation scheme and a coding rate).

As described above, it is necessary to first decide a desired transmission beam on the base station side in the beam sweeping procedure, and decide the CQI on the terminal side in the procedure of the CQI acquisition, and notify the base station of it from the terminal through the CQI feedback.

(Beam Recovery)

In the present embodiment, the beam recovery (Beam Recovery) is to search for and use another new beam because a beam between the base station and the terminal is unavailable for some reason. The reasons why Beam Recovery is necessary are generally as follows.

(Reason 1) Blocking

This is a state in which an obstacle such as a car or a person comes between a base station and a terminal, a beam from the base station does not thus reach, and the communication of control signals and user data is not possible between the base station and the terminal.

(Reason 2) Interference

This is a state in which signals from another base station and another terminal serve as interference, and it is not possible to transmit or receive signals of interest between a base station and a terminal.

Blocking means that signals are completely lost. Unless a vehicle or a person that is an obstacle thereto goes away, communication using the same beam is least likely to be restored. Even if a base station slightly changes the frequency for transmitting data, it seems impossible to transmit and receive beams in all neighboring frequency bands by using the direction of the obstacle. It is also highly likely to remain impossible for several seconds before the obstacle goes away to perform communication in the time direction.

Meanwhile, all time/frequency resources do not have interference. Therefore, interference is eliminated if another base station and another terminal stop transmission. In LTE, control signals and user data are provided from one beam. Different from this, in 5G, control signals and user data are transmitted and received by using a plurality of beams, and it is thus necessary to improve the resistance to interference in consideration of this characteristic.

In contrast, blocking basically requires a base station to change a beam. To change a beam, prompt restoration is necessary, that is, the new beam needs promptly identifying. This is because some applications use communication using beams for the control of vehicles, control of drones, control of remote medical apparatuses, etc. required to continuously perform communication with low delay.

(Recovery Target)

A variety of recovery targets are conceivable. The following is a list of the possible recovery targets.

(1) PDCCH (Physical Downlink Control Channel)

PDCCH is a channel in which Downlink control signals are transmitted, and is more important than user data. Therefore, it is desirable to promptly restore from a situation in which a terminal is unable to receive control signals.

(2) PDSCH (Physical Downlink Shard Channel)

PDSCH is a channel in which Downlink user data is transmitted. It is not possible in many cases for a terminal to receive the user data itself. For example, interference sometimes causes a terminal to be temporarily unable to receive user data. Normally, when a terminal is unable to receive the user data, the terminal notifies the base station by returning NACK to the base station that the terminal is unable to receive the user data, and causes the base station to retransmit the same data again.

(3) PUCCH (Physical Uplink Control Channel)

PUSCH is a channel in which Uplink control signals are transmitted, and is important similarly to Downlink control signals.

(4) PUSCH (Physical Uplink Shared Channel)

PDSCH is a channel in which Uplink user data is transmitted.

(5) Beam

This is a beam used between a base station and a terminal. After deciding a beam, the base station uses the beam to perform Uplink and Downlink transmission and reception. Therefore, in a case where the beam used is not available in itself, the base station needs to promptly find a new appropriate beam. After all, it is the beam that is to be restored first. It is not possible to restore PDCCH alone before restoring a beam. In other words, restoring a beam is the most important of the five mentioned above.

(Recovery Environment)

Basically, a base station seems to provide a plurality of beams in many cases as a recovery environment. This is because, if there is another beam when blocking occurs, communication between a base station and a terminal is not completely interrupted. However, it is not possible for the base station to use a plurality of beams at all times, but a case is also conceivable where communication is performed by using only one beam. In such a case, the base station needs to promptly find a new appropriate beam.

Early detection of interference and blocking is important for performing Beam Recovery. In the existing communication systems such as LTE, the inability to receive control signals such as PDCCH causes it to be recognized that a problem occurs, and an action such as re-coupling is taken. In contrast, in systems that perform beam forming, it is often too late to take an action after it is completely impossible to receive PDCCH, and it is necessary to perform a restoration process as early as possible. Thus, in the stage of beam management, the terminal determines the quality of the received beam by measuring RSRP (Reference Signal Received Power), and reports the quality (RSRP) to the base station. However, although a report for a beam simply serves as a trigger, a method is very inefficient of starting over again beam management to look for another beam just because the RSRP deteriorates. That is, it is unnecessary to start over the procedure of beam management if the quality is temporarily deteriorated.

Accordingly, in view of the points described above, the discloser of the present application has intensively studied technology that makes it possible to promptly and efficiently find a new beam in a case where it is not possible to perform communication by using a beam due to blocking, interference, or the like. As a result, the discloser of the present application has devised the technology that makes it possible to promptly and efficiently find a new beam in a case where it is not possible to perform communication by using a beam due to blocking, interference, or the like, as described below.

[1.2. Configuration Examples and Operation Examples]

Figure 9:
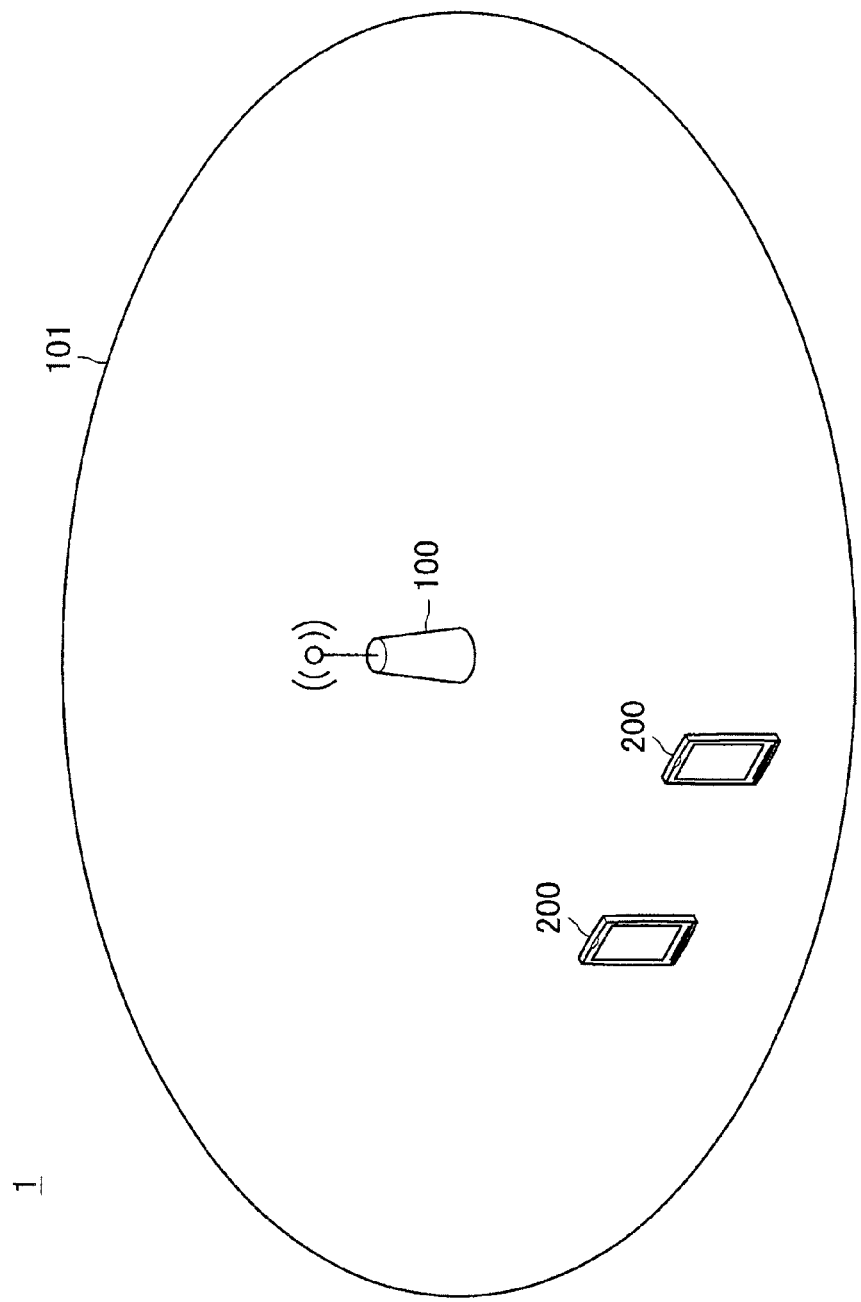
FIG. 9 is an explanatory diagram illustrating an example of a schematic configuration of a system according to an embodiment of the present disclosure.

First, a schematic configuration of a system according to the embodiment of the present disclosure is described with reference to the drawings. FIG. 9 is an explanatory diagram illustrating an example of a schematic configuration of a system according to the embodiment of the present disclosure. FIG. 9 illustrates that the system according to the embodiment of the present disclosure includes a base station 100 and a terminal apparatus 200. A system 1 is a system that complies with, for example, LTE, LTE-Advanced, the fifth-generation mobile communication system (5G), or similar communication standards.

(Base Station 100)

The base station 100 performs wireless communication with the terminal apparatus 200. For example, the base station 100 performs wireless communication with the terminal apparatus 200 positioned in a cell 101 of the base station 100.

Especially in the embodiment of the present disclosure, the base station 100 performs beam forming. For example, the beam forming is beam forming of large-scale MIMO. The beam forming may also be referred to as beam forming of massive MIMO, beam forming of free dimension (free dimension) MIMO, or three-dimensional beam forming. Specifically, for example, the base station 100 includes a directional antenna usable for large-scale MIMO, and performs beam forming of the large-scale MIMO by multiplying a transmission signal by a weight set for the directional antenna.

(Terminal Apparatus 200)

The terminal apparatus 200 performs wireless communication with the base station 100. For example, the terminal apparatus 200 performs wireless communication with the base station 100 in a case where the terminal apparatus 200 is positioned within the cell 101 of the base station 100.

Figure 10:
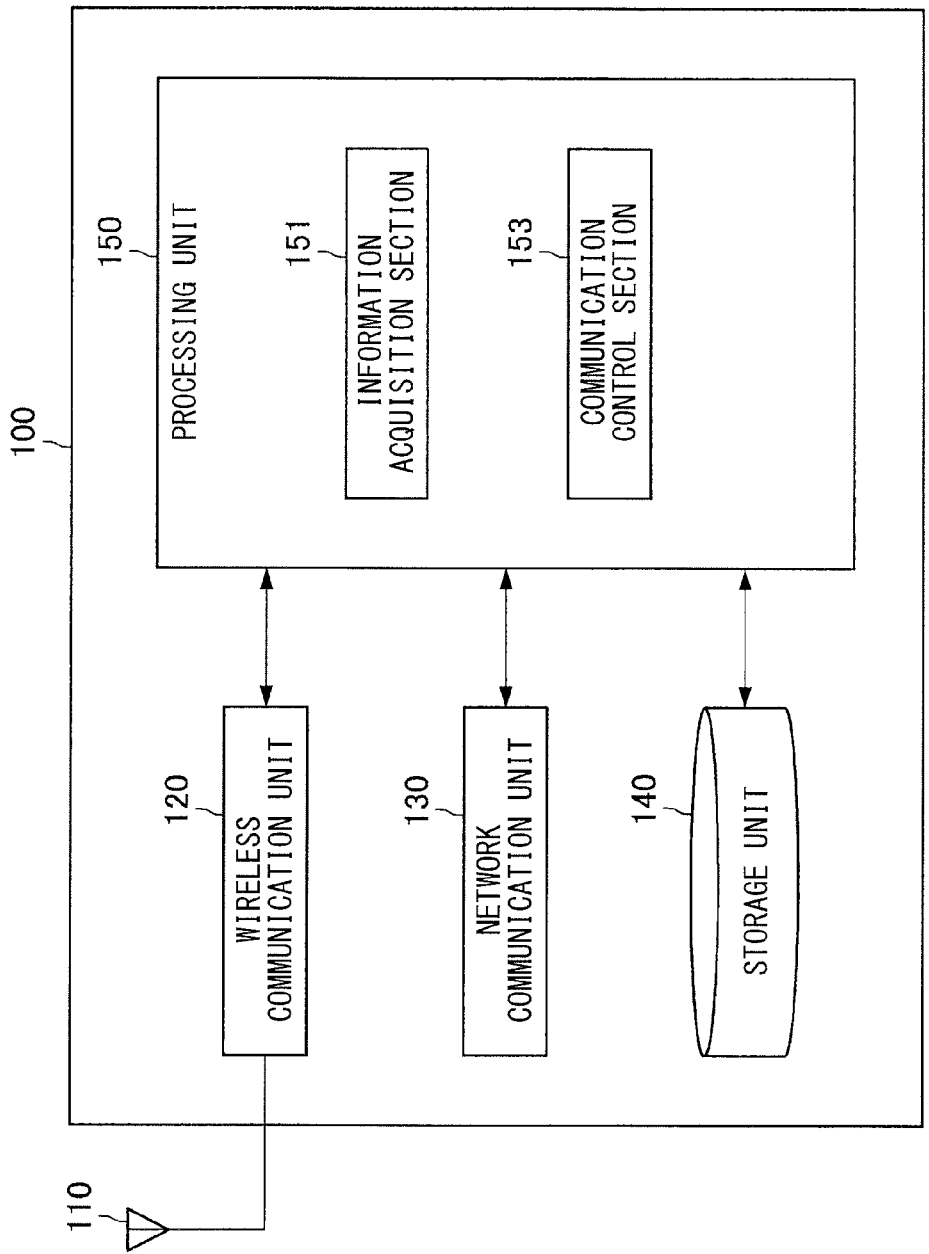
FIG. 10 is a block diagram illustrating an example of a configuration of a base station 100 according to the embodiment.
Figure 11:
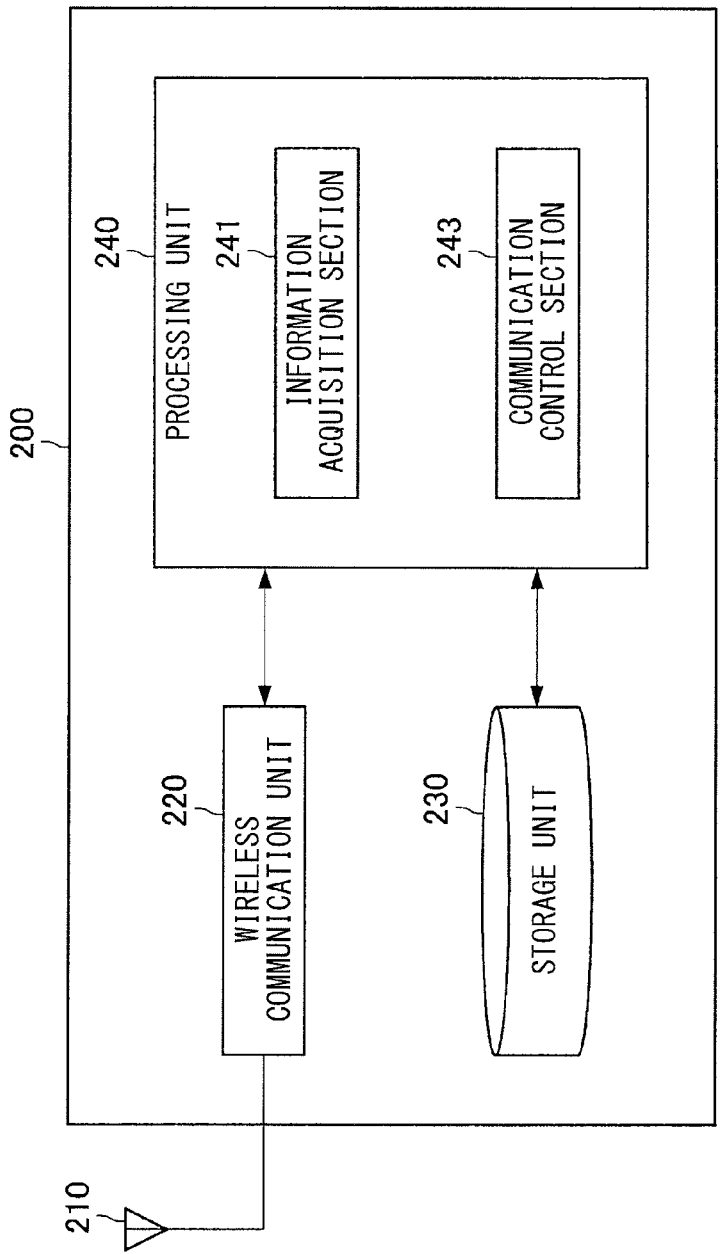
FIG. 11 is a block diagram illustrating an example of a configuration of a terminal apparatus 200 according to the embodiment.

Next, with reference to FIGS. 10 and 11, examples of configurations of the base station 100 and the terminal apparatus 200 are described.

First, with reference to FIG. 10, an example of a configuration of the base station 100 according to the embodiment of the present disclosure is described. FIG. 10 is a block diagram illustrating an example of a configuration of the base station 100 according to the embodiment of the present disclosure. With reference to FIG. 10, the base station 100 includes an antenna unit 110, a wireless communication unit 120, a network communication unit 130, a storage unit 140, and a processing unit 150.

(Antenna Unit 110)

The antenna unit 110 radiates signals outputted by the wireless communication unit 120 into space as radio waves. In addition, the antenna unit 110 converts radio waves in space into signals, and outputs the signals to the wireless communication unit 120.

For example, the antenna unit 110 includes a directional antenna. For example, the directional antenna is a directional antenna usable for large-scale MIMO.

(Wireless Communication Unit 120)

The wireless communication unit 120 transmits and receives signals. For example, the wireless communication unit 120 transmits a downlink signal to the terminal apparatus 200 and receives an uplink signal from the terminal apparatus 200.

(Network Communication Unit 130)

The network communication unit 130 transmits and receives information. For example, the network communication unit 130 transmits information to another node and receives information from the other node. For example, the other node described above includes another base station and a core network node.

(Storage Unit 140)

The storage unit 140 stores a program and data for an operation of the base station 100.

(Processing Unit 150)

The processing unit 150 provides various functions of the base station 100. The processing unit 150 includes an information acquisition section 151 and a control section 153. It should be noted that the processing unit 150 may further include other components in addition to these components. That is, the processing unit 150 may also perform operations other than operations of these components.

Specific operations of the information acquisition section 151 and the control section 153 are described below in detail.

Specifically, the information acquisition section 151 acquires information sent from the terminal apparatus 200, in particular, information regarding the reception status of a beam transmitted by the base station 100.

In addition, the control section 153 controls the transmission of a beam from the base station 100, the setting of beam sweeping, and the like.

Next, an example of a configuration of the terminal apparatus 200 according to the embodiment of the present disclosure is described with reference to FIG. 11. FIG. 11 is a block diagram illustrating an example of a configuration of the terminal apparatus 200 according to the embodiment of the present disclosure. With reference to FIG. 11, the terminal apparatus 200 includes an antenna unit 210, a wireless communication unit 220, a storage unit 230, and a processing unit 240.

(Antenna Unit 210)

The antenna unit 210 radiates signals outputted by the wireless communication unit 220 into space as radio waves. In addition, the antenna unit 210 converts radio waves in space into signals, and outputs the signals to the wireless communication unit 220.

(Wireless Communication Unit 220)

The wireless communication unit 220 transmits and receives signals. For example, the wireless communication unit 220 receives a downlink signal from the base station 100 and transmits an uplink signal to the base station 100.

(Storage Unit 230)

The storage unit 230 stores a program and data for an operation of the terminal apparatus 200.

(Processing Unit 240)

The processing unit 240 provides various functions of the terminal apparatus 200. The processing unit 240 includes an information acquisition section 241 and a control section 243. It should be noted that the processing unit 240 may further include other components in addition to these components. That is, the processing unit 240 may also perform operations other than operations of these components.

Specific operations of the information acquisition section 241 and the control section 243 are described below in detail.

The configuration example of the terminal apparatus 200 has been described above. Next, operation examples of the base station 100 and the terminal apparatus 200 are described.

Operation Example 1

As described above, when the quality of a beam in use deteriorates, it is required to perform a restoration process as early as possible. The terminal then determines the quality of the received beam by measuring RSRP, and reports the quality (RSRP) to the base station. However, although a report from the terminal for a beam simply serves as a trigger, a method is inefficient of starting over again beam management to look for another beam just because the RSRP deteriorates. In the case of the temporary deterioration of quality, communication with the terminal may be restored by starting over again beam sweeping for the nearest beam. However, in a case where it is not possible to restore communication simply by selecting the nearby beam again, it may be required to perform sweeping for all beams. In addition, in a case where the terminal moves, the base station has to keep tracking the terminal and keep pointing a beam to the terminal, but a deviation of the tracking may also cause communication quality to deteriorate. That is, it is unclear for the base station whether the deterioration is the temporary deterioration of quality or the deterioration that makes it necessary to start over the beam management procedure. Accordingly, starting over the beam management to search for another beam not only takes time to restore the communication, but also consumes resources in vain.

The beam management is a procedure of performing more detailed accurate beam sweeping (e.g., beam sweeping using ten beams) in the direction narrowed by rough beam sweeping (rough beam sweeping that is, for example, beam sweeping using 100 beams), and finally deciding several optimal beams (e.g., two or three beams). In the accurate beam sweeping, for example, ten beams to be provided are changed each time, and ten beam candidates are changed and provided in accordance with the movement of the terminal apparatus 200. In a case where there is no desired beam among the ten beam candidates of accurate beam sweeping, it is known that the quality deteriorates because the received power is low in the RSRP the terminal apparatus 200 reports to the base station 100. Starting over rough beam sweeping in this stage causes a lot of waste.

Accordingly, in the present embodiment, the base station 100 provides beam sweeping (recovery beam sweeping) having a property between rough beam sweeping and accurate beam sweeping. In the present embodiment, the base station 100 prepares a plurality of types of recovery beam sweeping to cover a wider area than the area of accurate beam sweeping.

Figure 12:
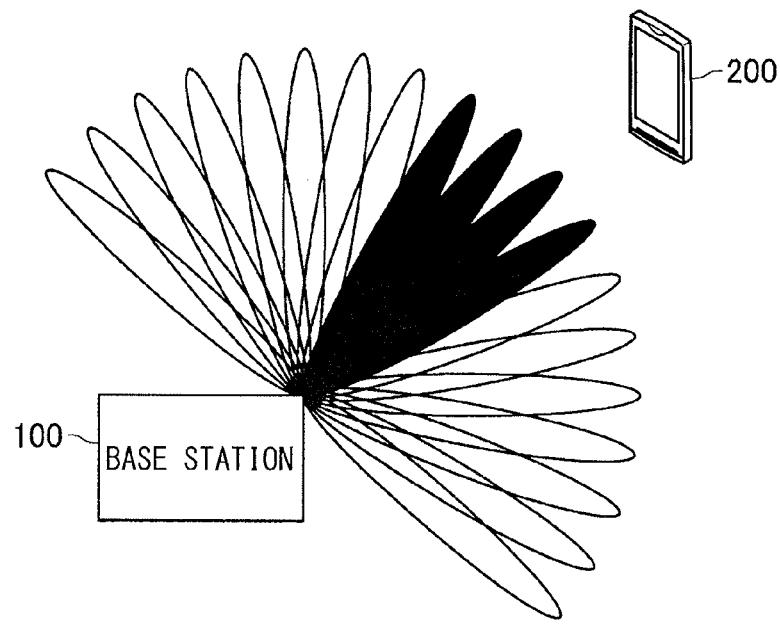
FIG. 12 is an explanatory diagram illustrating an example of recovery beam sweeping provided by the base station 100 according to the embodiment.
Figure 13:
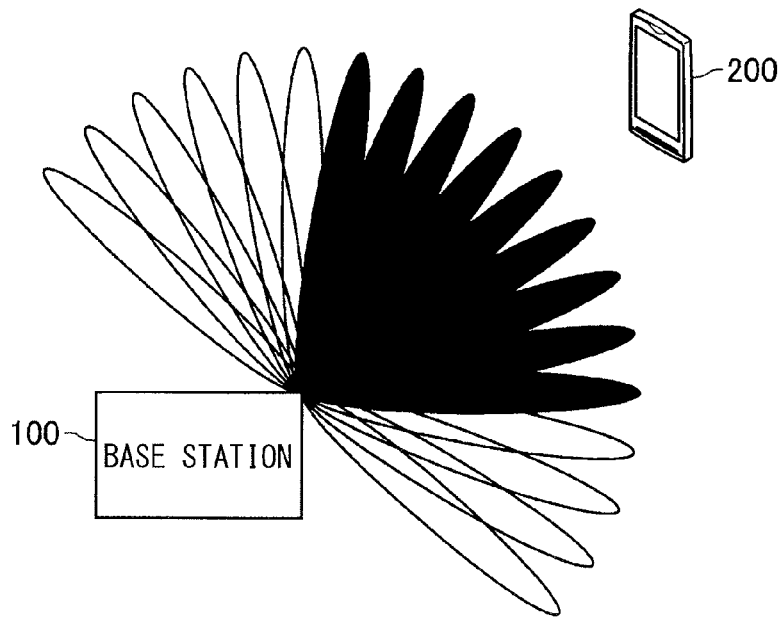
FIG. 13 is an explanatory diagram illustrating an example of the recovery beam sweeping provided by the base station 100 according to the embodiment.
Figure 14:
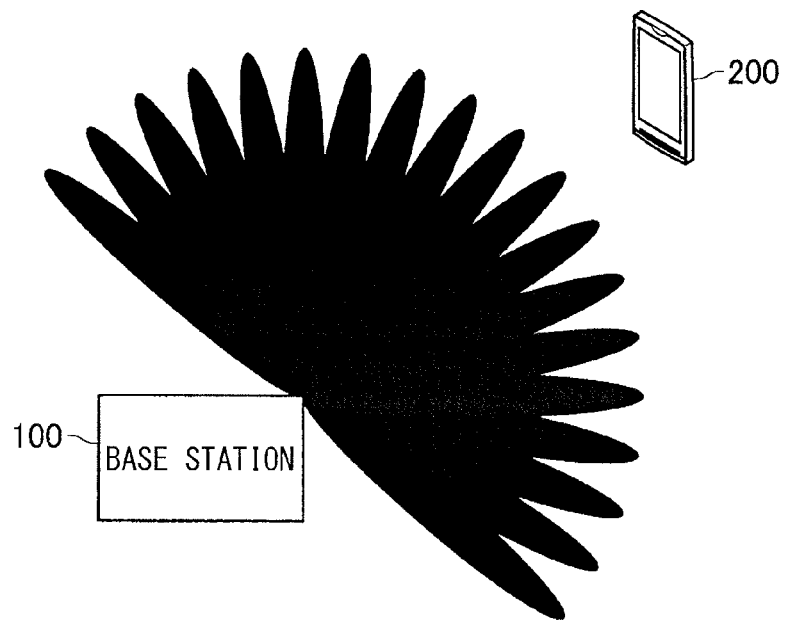
FIG. 14 is an explanatory diagram illustrating an example of the recovery beam sweeping provided by the base station 100 according to the embodiment.

Each of FIGS. 12, 13, and 14 is an explanatory diagram illustrating an example of the recovery beam sweeping provided by the base station 100 according to the present embodiment. FIG. 12 is an example of recovery beam sweeping that sweeps a slightly wider area than the area of the accurate beam sweeping. FIG. 13 is an example of recovery beam sweeping that sweeps a wider area than the area of the recovery beam sweeping of FIG. 12. FIG. 14 is an example of recovery beam sweeping that sweeps all beams regardless of accurate beam sweeping. In the following description, a combination of beams (beam group) used for the beam sweeping in FIG. 12 is referred to as beam group A, a combination of beams used for the beam sweeping in FIG. 13 is referred to as beam group B, and a combination of beams used for the beam sweeping in FIG. 14 is referred to as beam group C.

Figure 15:
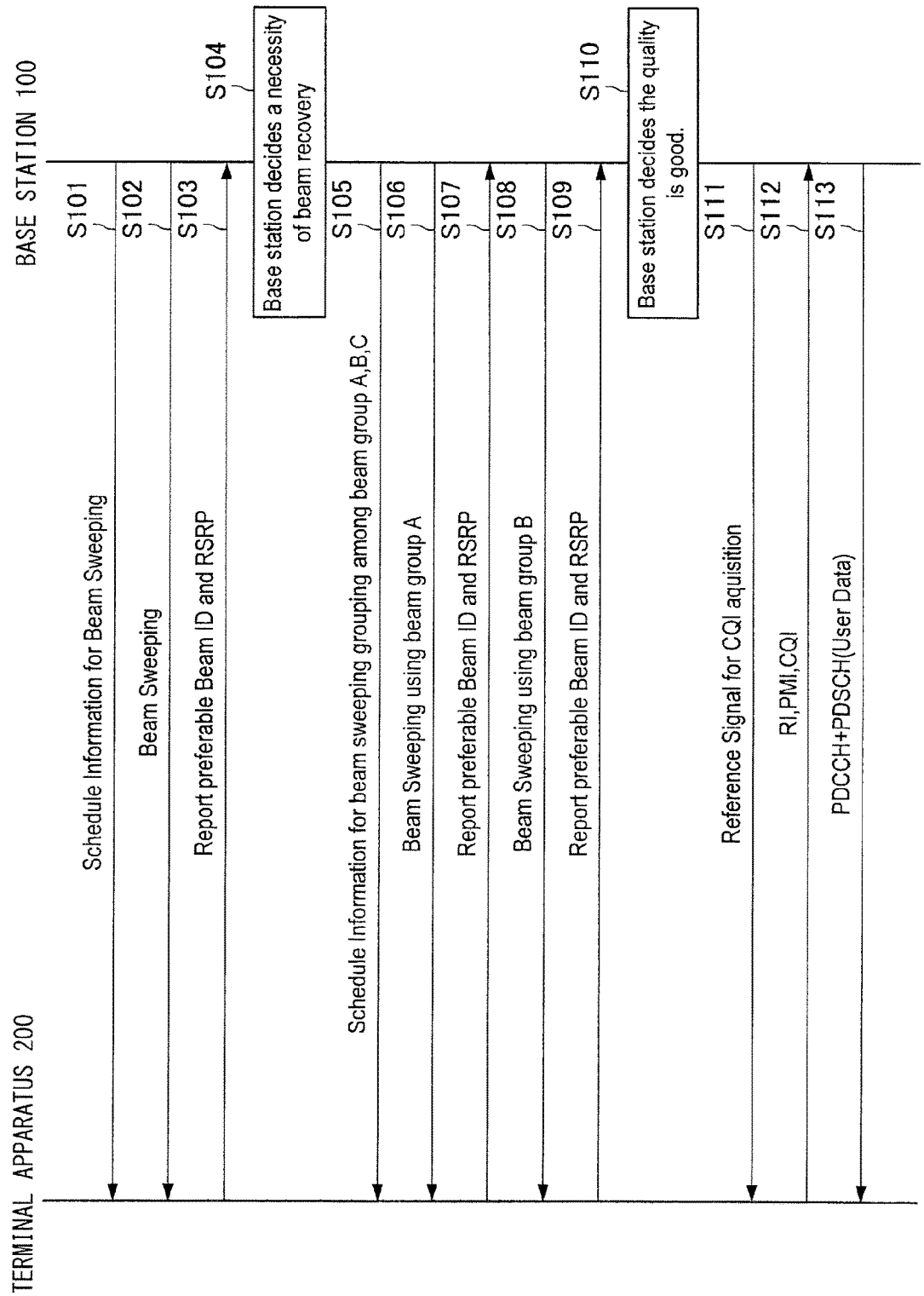
FIG. 15 is an explanatory diagram illustrating operation examples of the base station 100 and the terminal apparatus 200 according to the embodiment as a sequence diagram.

The base station 100 determines which beam group should be used to perform the recovery beam sweeping, and executes the recovery beam sweeping. FIG. 15 is an explanatory diagram illustrating operation examples of the base station 100 and the terminal apparatus 200 according to the present embodiment as a sequence diagram.

The base station 100 transmits schedule information (schedule information) for beam sweeping to the terminal apparatus 200 (step S101). The beam sweeping here is normal beam sweeping that is not recovery beam sweeping. Then, the base station 100 executes the beam sweeping on the basis of the schedule information transmitted to the terminal apparatus 200 (step S102). The terminal apparatus 200 receives beams transmitted from the base station 100 and reports the beam ID and RSRP of the appropriate beam (step S103).

Upon receiving the report from the terminal apparatus 200, the base station 100 determines whether or not beam recovery is necessary (step S104). In the example of FIG. 15, it is assumed that the base station 100 determines that beam recovery is necessary, on the basis of the report from the terminal apparatus 200.

Subsequently, the base station 100 transmits the respective pieces of schedule information for the recovery beam sweeping using the beam groups A, B, and C to the terminal apparatus 200 (step S105). This notification is issued by using a beam other than the beam with which communication is no longer possible, or using a signal of another Component Carrier when Carrier Aggregation is performed. Here, collectively transmitting the respective pieces of schedule information for recovery beam sweeping using the beam groups A, B, and C causes resources for the recovery beam sweeping to be secured in advance, allowing the efficiency of the recovery beam sweeping to be increased.

Subsequently, the base station 100 first executes the recovery beam sweeping using the beam group A having the smallest number of beams on the basis of the pieces of schedule information for the recovery beam sweeping (step S106). The terminal apparatus 200 receives beams transmitted from the base station 100 and reports the beam ID and RSRP of the appropriate beam (step S107).

Upon receiving the report from the terminal apparatus 200, the base station 100 determines whether or not an optimal beam is found through the recovery beam sweeping in the beam group A. The base station 100 terminates the recovery beam sweeping if an optimal beam is found. However, if no optimal beam is found, the base station 100 then executes the recovery beam sweeping using the beam group B having the second smallest number of beams. Here, the base station 100 executes the recovery beam sweeping using the beam group B (step S108). The terminal apparatus 200 receives beams transmitted from the base station 100 and reports the beam ID and RSRP of the appropriate beam (step S109).

Upon receiving the report from the terminal apparatus 200, the base station 100 determines whether or not an optimal beam is found through the recovery beam sweeping in the beam group A. The base station 100 terminates the recovery beam sweeping if an optimal beam is found. However, if no optimal beam is found, the base station 100 then executes the recovery beam sweeping using the beam group C having the largest number of beams. Here, it is assumed that an optimal beam is found through the recovery beam sweeping using the beam group B (step S110).

When an optimal beam is found through the recovery beam sweeping using the beam group B, the base station 100 transmits a reference signal (Reference Signal) for CQI acquisition to the terminal apparatus 200 (step S111). Subsequently, the terminal apparatus 200 transmits the RI (Rank Indicator), PMI (Precoding Matrix Indicator), and CQI (Channel Quality Indicator) of the received beam to the base station 100 (step S112). The RI represents the number of Layers of MIMO, the PMI indicates the precoding of the transmission side, and the CQI indicates the modulation scheme recommended by the terminal apparatus 200. The base station 100 then transmits user data in PDCCH and PDSCH by using the optimal beam (step S113).

In the example of FIG. 15, the base station 100 determines whether or not beam recovery is necessary, on the basis of the report sent from the terminal apparatus 200. However, the present disclosure is not limited to the example. For example, in a case where a response that should come from the terminal apparatus 200 does not come, the base station 100 may also determine that beam recovery is necessary.

Figure 16:
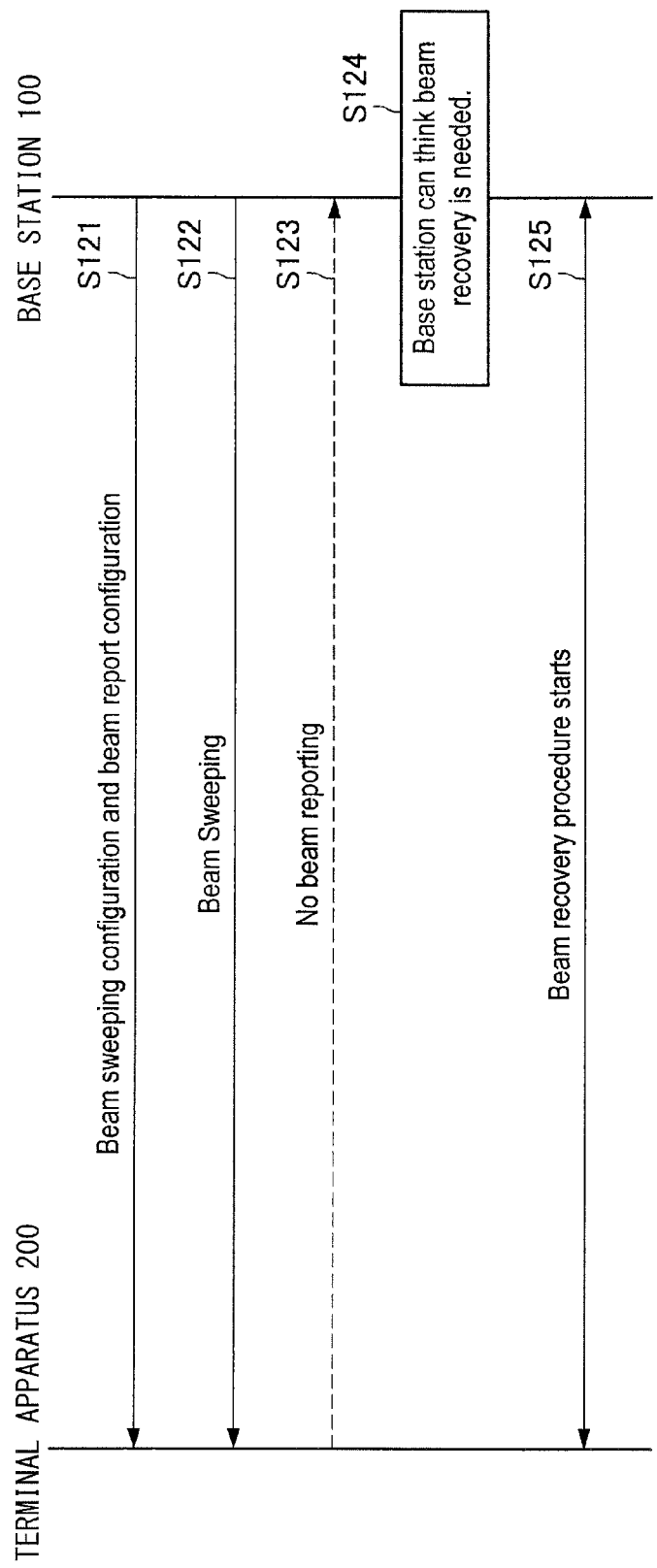
FIG. 16 is an explanatory diagram illustrating operation examples of the base station 100 and the terminal apparatus 200 according to the embodiment as a sequence diagram.

FIG. 16 is an explanatory diagram illustrating operation examples of the base station 100 and the terminal apparatus 200 according to the present embodiment as a sequence diagram. The base station 100 transmits the setting of beam sweeping and the setting of a report of a beam to the terminal apparatus 200 (step S121). Then, the base station 100 executes the beam sweeping on the basis of the setting transmitted to the terminal apparatus 200 (step S122). Here, a report for a beam (e.g., beam ID and RSRP of an appropriate beam) should be normally sent from the terminal apparatus 200. Accordingly, in a case where no report is sent from the terminal apparatus 200 even after a predetermined period elapses (step S123), the base station 100 is able to determine that beam recovery is necessary (step S124). Thereafter, the series of beam recovery processes as illustrated in FIG. 15 is executed between the base station 100 and the terminal apparatus 200 (step S125).

Figure 17:
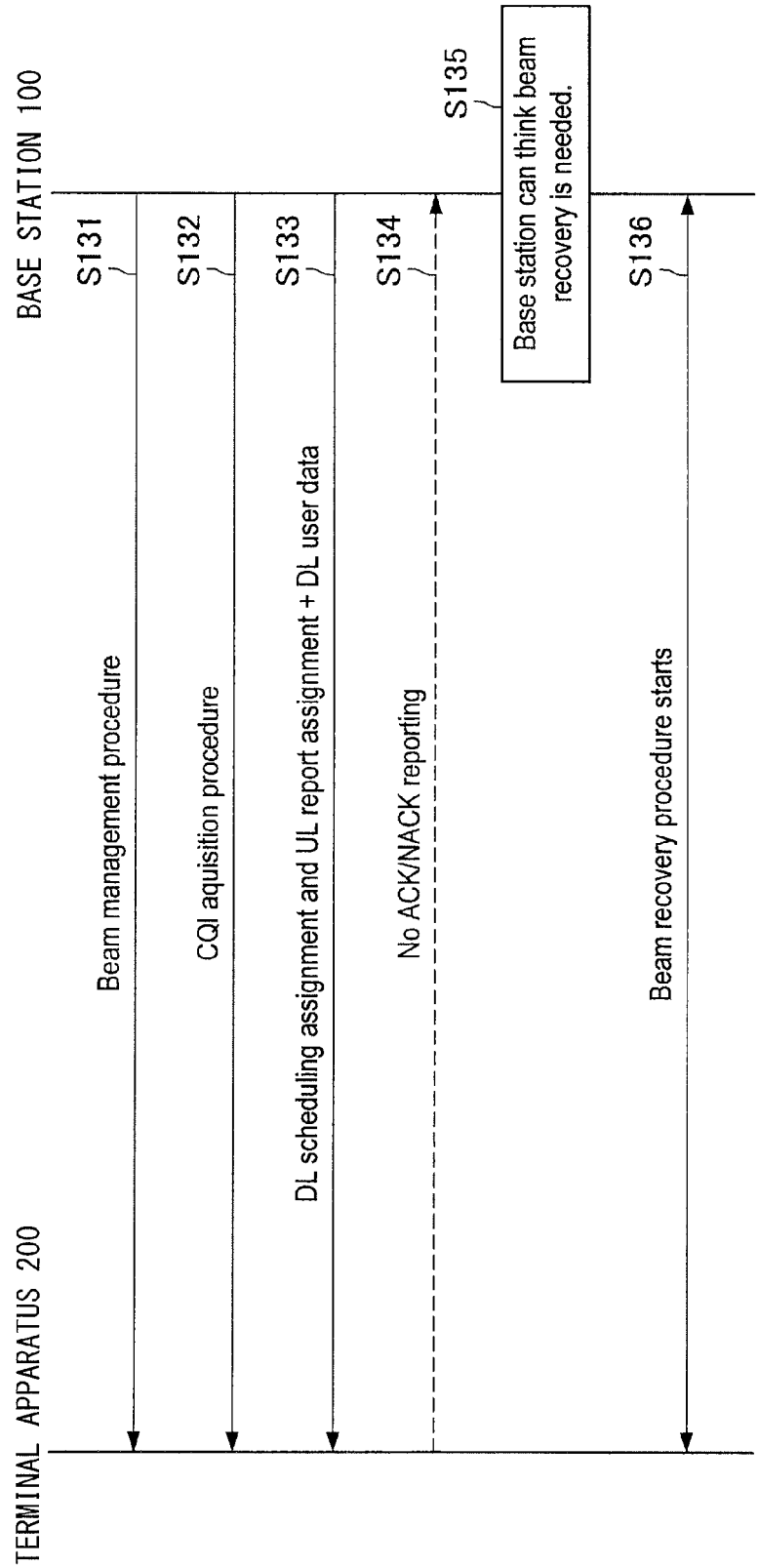
FIG. 17 is an explanatory diagram illustrating operation examples of the base station 100 and the terminal apparatus 200 according to the embodiment as a sequence diagram.

FIG. 17 is an explanatory diagram illustrating operation examples of the base station 100 and the terminal apparatus 200 according to the present embodiment as a sequence diagram. It is assumed that the procedure of beam management (step S131) and the procedure of CQI acquisition (step S132) are performed in advance between the base station 100 and the terminal apparatus 200. In this state, the base station 100 performs scheduling allocation of downlink data, scheduling allocation of uplink data, and transmission of downlink user data to the terminal apparatus 200 (step S133).

Here, ACK or NACK for the transmission data from the base station 100 should be normally sent from the terminal apparatus 200. Accordingly, in a case where no response is sent from the terminal apparatus 200 even after a predetermined period of time elapses (step S134), the base station 100 is able to determine that beam recovery is necessary (step S135). Thereafter, the series of beam recovery processes as illustrated in FIG. 15 is executed between the base station 100 and the terminal apparatus 200 (step S136).

In the procedure of beam recovery illustrated in FIG. 15, the base station 100 transmits the respective pieces of schedule information for the recovery beam sweeping using the beam groups A, B, and C to the terminal apparatus 200. However, in a case where it is not possible to secure communication by using another beam or another Component Carrier, a case is possible where this downlink signaling itself does not reach the terminal apparatus 200 from the base station 100. The procedure of beam recovery that takes this case into consideration is described.

Figure 18:
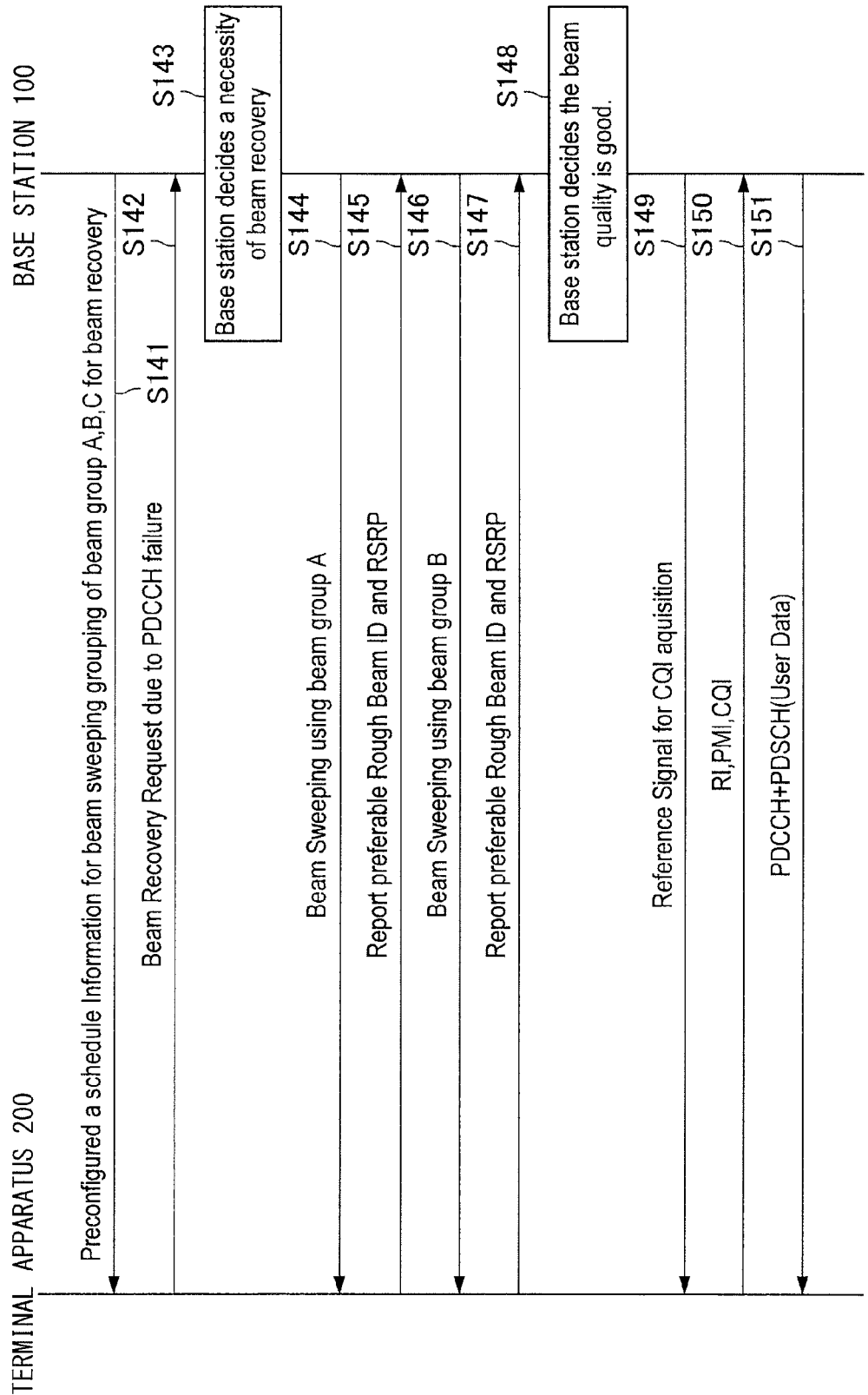
FIG. 18 is an explanatory diagram illustrating operation examples of the base station 100 and the terminal apparatus 200 according to the embodiment as a sequence diagram.

FIG. 18 is an explanatory diagram illustrating operation examples of the base station 100 and the terminal apparatus 200 according to the present embodiment as a sequence diagram. In this example, the base station 100 transmits the respective pieces of schedule information for the recovery beam sweeping using the beam groups A, B, and C to the terminal apparatus 200 before beam recovery is performed (step S141). This enables the terminal apparatus 200 to grasp the place of the resources for the recovery beam sweeping even in a case where communication is not ensured by using another beam or another Component Carrier.

When a beam recovery request is sent from the terminal apparatus 200 to the base station 100 (step S142), the base station 100 determines that beam recovery is necessary (step S143). Examples of a transmission trigger of a beam recovery request from the terminal apparatus 200 may include transmission failure of PDCCH, and the like.

Figure 19:
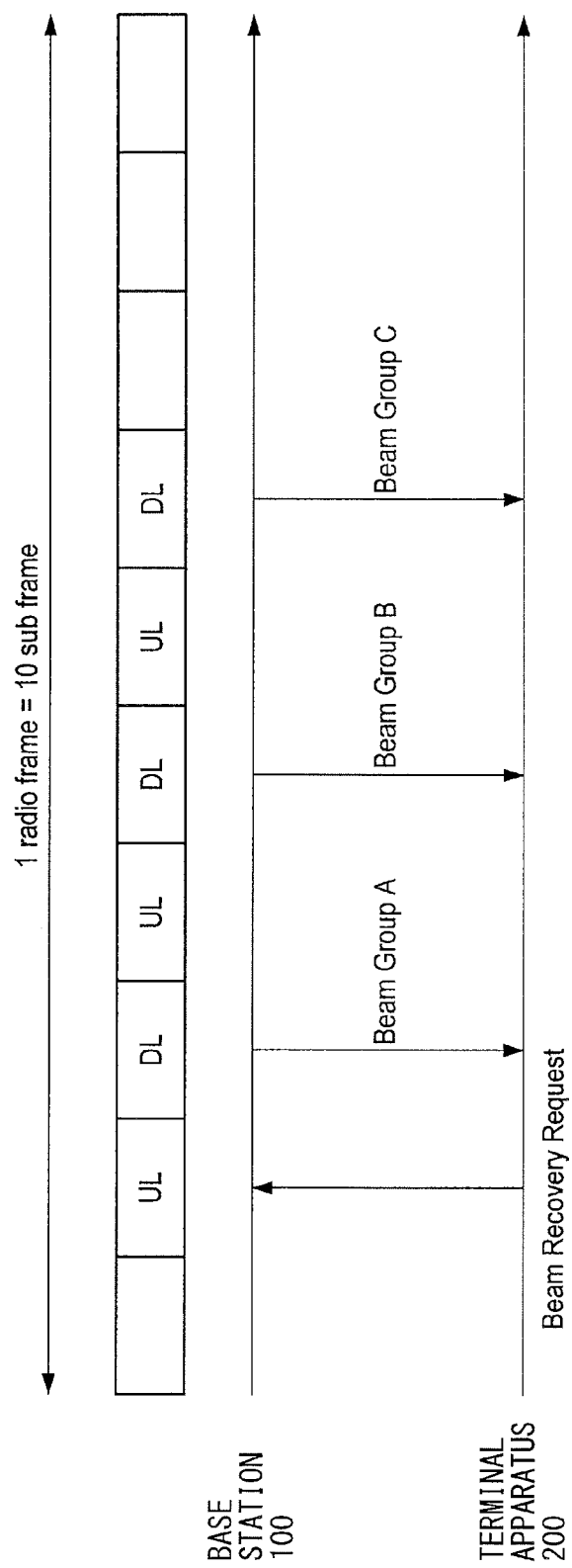
FIG. 19 is an explanatory diagram illustrating that sweeping is performed by using a beam group for beam recovery in a Sub frame a certain number of Sub frames after a trigger of the beam recovery.

Subsequently, the base station 100 first executes the recovery beam sweeping using the beam group A having the smallest number of beams on the basis of the pieces of schedule information for the recovery beam sweeping that are transmitted to the terminal apparatus 200 in advance (step S144). In this example, for example, as illustrated in FIG. 19, it is decided in advance that sweeping using a beam group for beam recovery is performed in a Sub frame a certain number of Sub frames after the trigger of beam recovery. In the example of FIG. 19, the beam sweeping using the beam group A is executed in the Sub frame subsequent to the Sub frame in which the beam recovery request is sent, the beam sweeping using the beam group B is executed in the Sub frame three Sub frames after the Sub frame in which the beam recovery request is sent, and the beam sweeping using the beam group A is executed in the Sub frame five Sub frames after the Sub frame in which the beam recovery request is sent. The sweeping of each beam group is followed by an uplink resource for a report from the terminal apparatus 200. In this manner, a resource for recovery beam sweeping is secured in advance by using the relative position to the trigger of beam recovery in advance.

A notification of the place of the resource for recovery beam sweeping may be issued through communication using a link of beams in another Component Carrier or another Partial Band (partial band) in a case where the link of those other beams is present and communication between the terminal apparatus 200 and the base station 100 is possible. A case where another Partial Band is used means a case where one Component Carrier is divided into a plurality of bands, and beam management is performed in each Partial Band.

In the method of securing a resource for recovery beam sweeping by using a relative position to the trigger of beam recovery, the trigger of beam recovery may be the case where a report of a beam does not come from the terminal, for example, as illustrated in FIG. 16, or the case where no response to ACK or NACK for user data comes as illustrated in FIG. 17.

In addition, in a case where a link of a plurality of beams is retained between the terminal apparatus 200 and the base station 100 in the same Component Carrier or the same Partial band, communication using the remaining beams is available to one beam recovery among them, and a notification of the place of a resource of the beam sweeping for beam recovery may be thus issued by using the beam.

Needless to say, the execution timing of recovery beam sweeping is not limited to the example, but beam recovery needs to be performed early. Accordingly, it is not desirable that too long a period of time elapses from the transmission of a beam recovery request to the execution of the first recovery beam sweeping. The terminal apparatus 200 receives beams transmitted from the base station 100 and reports the beam ID and RSRP of the appropriate beam (step S145).

Upon receiving the report from the terminal apparatus 200, the base station 100 determines whether or not an optimal beam is found through the recovery beam sweeping in the beam group A. The base station 100 terminates the recovery beam sweeping if an optimal beam is found. However, if no optimal beam is found, the base station 100 then executes the recovery beam sweeping using the beam group B having the second smallest number of beams. Here, the base station 100 executes the recovery beam sweeping using the beam group B (step S146). The terminal apparatus 200 receives beams transmitted from the base station 100 and reports the beam ID and RSRP of the appropriate beam (step S147).

Upon receiving the report from the terminal apparatus 200, the base station 100 determines whether or not an optimal beam is found through the recovery beam sweeping in the beam group A. The base station 100 terminates the recovery beam sweeping if an optimal beam is found. However, if no optimal beam is found, the base station 100 then executes the recovery beam sweeping using the beam group C having the largest number of beams. Here, it is assumed that an optimal beam is found through the recovery beam sweeping using the beam group B (step S148).

When an optimal beam is found through the recovery beam sweeping using the beam group B, the base station 100 transmits a reference signal (Reference Signal) for CQI acquisition to the terminal apparatus 200 (step S149). Subsequently, the terminal apparatus 200 transmits the RI (Rank Indicator), PMI (Precoding Matrix Indicator), and CQI (Channel Quality Indicator) of the received beam to the base station 100 (step S150). The base station 100 then transmits user data in PDCCH and PDSCH by using the optimal beam (step S151).

The base station 100 performs recovery beam sweeping in the order of the beam groups A, B, and C at the time of beam recovery in the examples described so far. However, if the terminal apparatus 200 grasps the contents of the beam groups, it may be requested from the base station 100 which beam group should be used to perform recovery beam sweeping.

Figure 20:
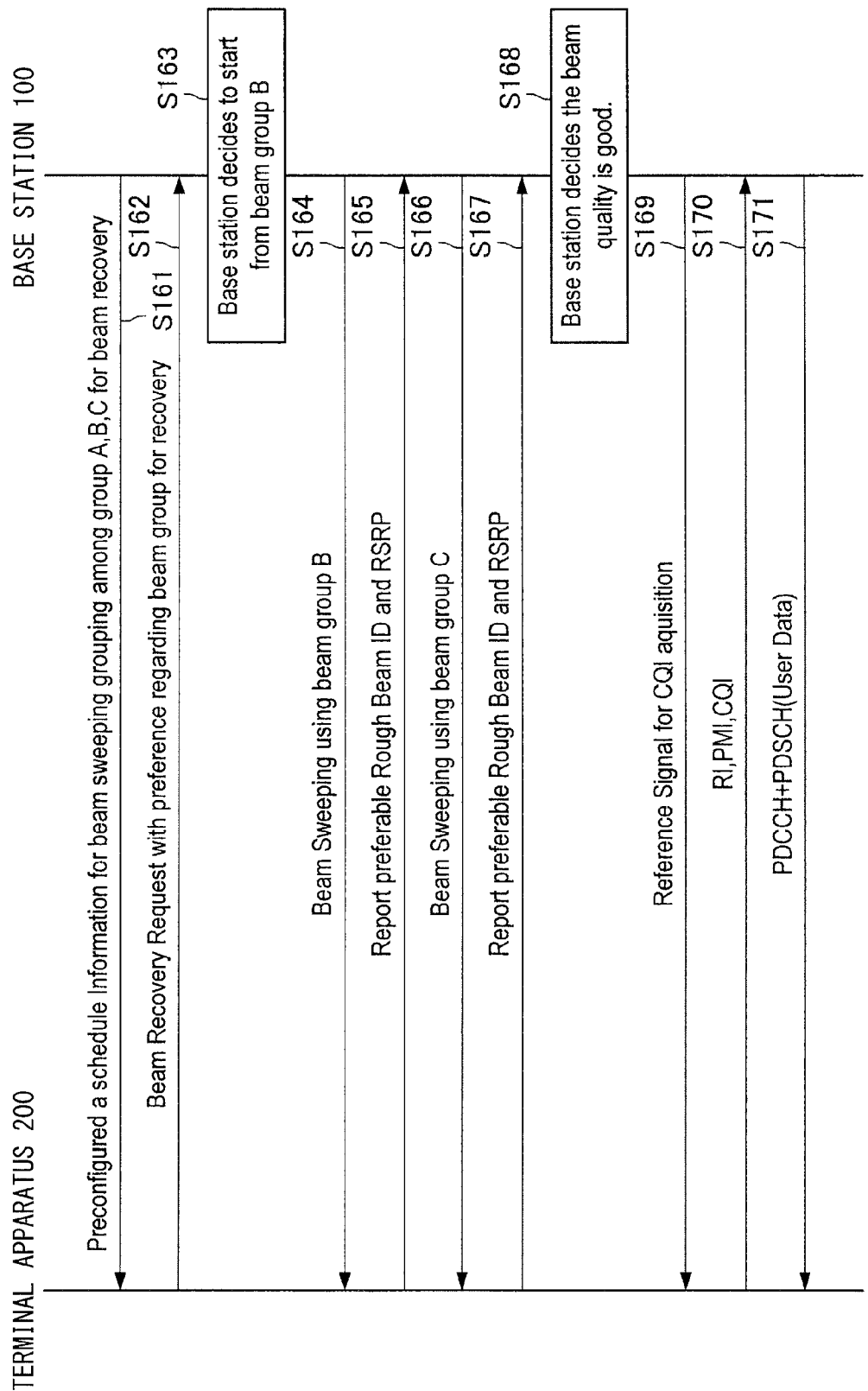
FIG. 20 is an explanatory diagram illustrating operation examples of the base station 100 and the terminal apparatus 200 according to the embodiment as a sequence diagram.

FIG. 20 is an explanatory diagram illustrating operation examples of the base station 100 and the terminal apparatus 200 according to the present embodiment as a sequence diagram. The base station 100 transmits the schedule information of beam sweeping and the setting of a beam group for recovery beam sweeping to the terminal apparatus 200 (step S161). Subsequently, the terminal apparatus 200 transmits a beam recovery request to the base station 100 on the basis of the setting of the beam group for the recovery beam sweeping (step S162). The transmission timing of a beam recovery request by the terminal apparatus 200 may be, for example, a case where the signal level from the base station 100 drops below a predetermined threshold. Here, it is assumed that the terminal apparatus 200 transmits, to the base station 100, a beam recovery request by the recovery beam sweeping using the beam group B.

The base station 100 receives the request from the terminal apparatus 200, and decides that beam recovery is executed by the recovery beam sweeping using the beam group B (step S163). Then, the base station 100 executes the recovery beam sweeping using the beam group B on the basis of the pieces of schedule information for the recovery beam sweeping (step S164). The terminal apparatus 200 receives beams transmitted from the base station 100 and reports the beam ID and RSRP of the appropriate beam (step S165).

Upon receiving the report from the terminal apparatus 200, the base station 100 determines whether or not an optimal beam is found through the recovery beam sweeping in the beam group B. The base station 100 terminates the recovery beam sweeping if an optimal beam is found. However, if no optimal beam is found, the base station 100 then executes the recovery beam sweeping using the beam group C. Here, the base station 100 executes the recovery beam sweeping using the beam group C (step S166). The terminal apparatus 200 receives beams transmitted from the base station 100 and reports the beam ID and RSRP of the appropriate beam (step S167).

When an optimal beam is found through the recovery beam sweeping using the beam group C (step S168), the base station 100 transmits a reference signal (Reference Signal) for CQI acquisition to the terminal apparatus 200 (step S169). Subsequently, the terminal apparatus 200 transmits the RI (Rank Indicator), PMI (Precoding Matrix Indicator), and CQI (Channel Quality Indicator) of the received beam to the base station 100 (step S170). The base station 100 then transmits user data in PDCCH and PDSCH by using the optimal beam (step S171).

Although an example of a case of the downlink has been described above, the procedure of beam recovery is similarly applicable to a case of the uplink.

Figure 21:
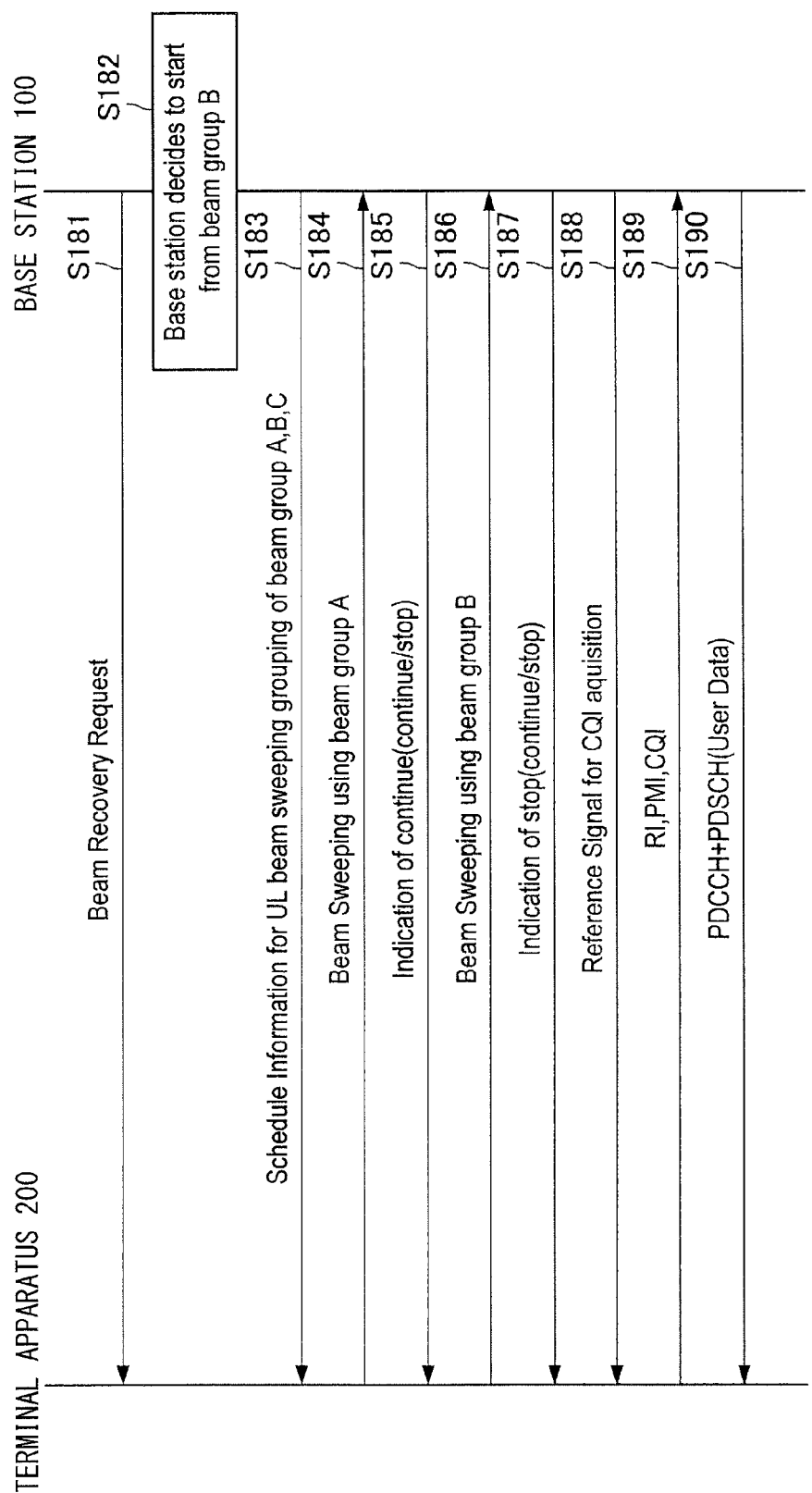
FIG. 21 is an explanatory diagram illustrating operation examples of the base station 100 and the terminal apparatus 200 according to the embodiment as a sequence diagram.

FIG. 21 is an explanatory diagram illustrating operation examples of the base station 100 and the terminal apparatus 200 according to the present embodiment as a sequence diagram. The terminal apparatus 200 transmits a beam recovery request to the base station 100 (step S181). The transmission timing of a beam recovery request by the terminal apparatus 200 may be, for example, a case where the signal level from the base station 100 drops below a predetermined threshold due to blocking or interference.

Upon receiving the request from the terminal apparatus 200, the base station 100 decides that beam recovery is executed (step S182). When it is decided that beam recovery is executed, the base station 100 then transmits the schedule information of uplink beam sweeping and the setting of a beam group for recovery beam sweeping to the terminal apparatus 200 (step S183).

Upon receiving the information sent from the base station 100 in step S183, the terminal apparatus 200 first executes the recovery beam sweeping using the beam group A (step S184). The base station 100 transmits an instruction (Indication of continue) as to whether or not the recovery beam sweeping is continued to the terminal apparatus 200 (step S185). Here, it is assumed that the base station 100 instructs the terminal apparatus 200 to continue the recovery beam sweeping.

Subsequently, upon receiving the instruction sent from the base station 100 in step S185, the terminal apparatus 200 then executes the recovery beam sweeping using the beam group B (step S186). The base station 100 transmits an instruction as to whether or not the recovery beam sweeping is continued to the terminal apparatus 200 (step S187). Here, it is assumed that the base station 100 instructs the terminal apparatus 200 to terminate the recovery beam sweeping.

When an optimal beam is found through the recovery beam sweeping using the beam group B, the base station 100 transmits a reference signal (Reference Signal) for CQI acquisition to the terminal apparatus 200 (step S188). Subsequently, the terminal apparatus 200 transmits the RI (Rank Indicator), PMI (Precoding Matrix Indicator), and CQI (Channel Quality Indicator) of the received beam to the base station 100 (step S189). The base station 100 then transmits user data in PDCCH and PDSCH by using the optimal beam (step S190).

The existing communication systems such as LTE have no operation of beam sweeping in the first place. Accordingly, there is no need to perform the operation of beam recovery. The present embodiment focuses on the peculiarity of the beam recovery and makes it possible to recover a beam as quickly as possible with as few resources as possible.

Operation Example 2

If the terminal apparatus 200 transmits a report after waiting for the recovery beam sweeping using one beam group to be completed when recovery beam sweeping for beam recovery is performed over a wide area as in the operation example 1, the time and resources are consumed in vain until beam recovery. Therefore, in this operation example 2, an operation example is described in which resources for the terminal apparatus 200 to make a report are secured in advance, and the terminal apparatus 200 is allowed to transmit a report even in the middle of recovery beam sweeping using one beam group.

Figure 22:
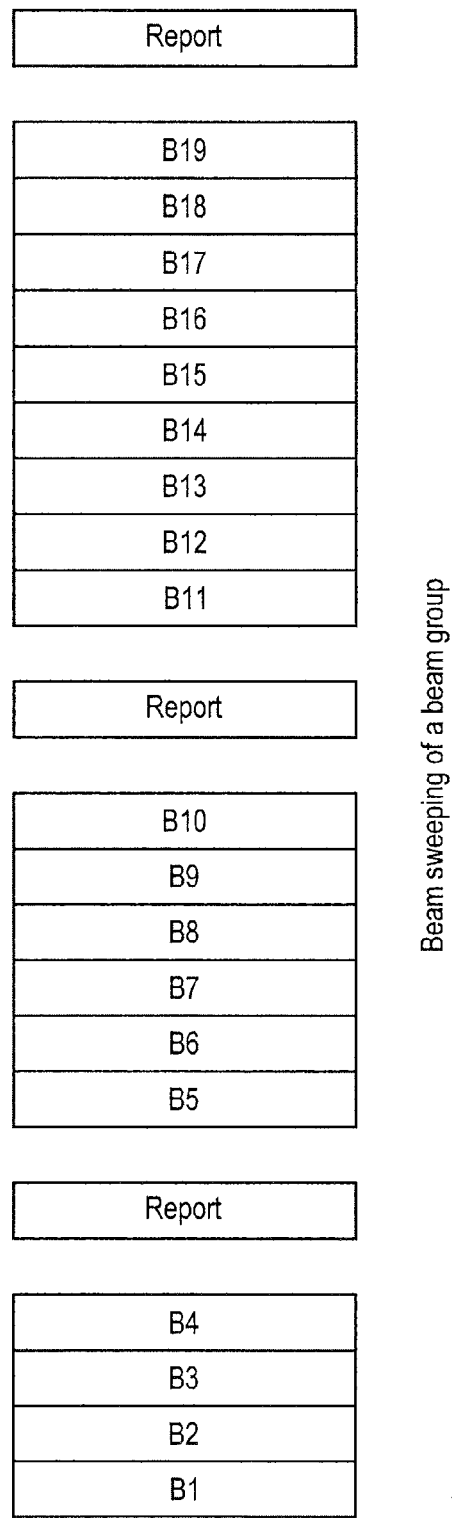
FIG. 22 is an explanatory diagram illustrating an example of a resource allocated by the base station 100.

FIG. 22 is an explanatory diagram illustrating an example of a resource allocated by the base station 100. Upon determining that beam recovery is necessary, the base station 100 notifies the terminal apparatus 200 of resources for a plurality of reports, and then provides a plurality of recovery beam sweeping sections. The plurality of recovery beam sweeping sections is, for example, set as a section A, a section B, and a section C. The section A includes beams B1 to B4, the section B includes beams B5 to B10, and the section C includes beams B11 to B19. Needless to say, the number of beams in each section and the number of sections are not limited to the example.

The base station 100 executes beam sweeping using the recovery beam sweeping section A, section B, and section C. In addition, the base station 100 prepares resources for reports between the respective sections in advance. That is, the base station 100 prepares resources between the recovery beam sweeping section A and the section B, between the section B and the section C, and after the section C.

In this manner, the terminal apparatus 200 has three reporting opportunities during the procedure of one recovery beam sweeping. Then, if there is a favorable beam among beams in the recovery beam sweeping section A, it is possible to report that there is a favorable beam to the base station 100 after the recovery beam sweeping section A is finished. In a case where there is a favorable beam among beams in the recovery beam sweeping section A, the base station 100 does not have to perform recovery beam sweeping on the recovery beam sweeping section B and section C. In addition, if there is no desirable beam in the recovery beam sweeping section A, the terminal apparatus 200 does not have to make a report after the recovery beam sweeping section A. Similarly, if there is no desirable beam in the recovery beam sweeping section B, the terminal apparatus 200 does not have to make a report after the recovery beam sweeping section B.

The existing communication systems such as LTE have no operation of beam sweeping in the first place. Accordingly, there is no concept of disposing a plurality of resources for reports during beam sweeping. Disposing a plurality of resources for reports during beam sweeping allows the terminal apparatus 200 to transmit a report to the base station 100 even in the middle of the beam sweeping.

As the method for the base station 100 to notify the terminal apparatus 200 where the resources for reports are, for example, when links of a plurality of beams are retained, the base station 100 may notify the terminal apparatus 200 through communication using the beams. In addition, when a beam is retained in another Component Carrier or another Partial Band, the base station 100 may notify the terminal apparatus 200 through communication using the beam.

Resources may be secured for a plurality of reports from the terminal apparatus 200 to the base station 100 at a relative position (how many sub frames relatively precede the sub frame for a report, and the like) from a trigger (e.g., method of issuing a notification of an emergency such as a lost link by using an uplink with no resource like Random Access) of beam recovery from the terminal apparatus 200. In this case, the intervals between reports may be fixed or preset.

The terminal apparatus 200 prepares a plurality of report timings in the recovery beam sweeping for beam recovery. After the terminal apparatus 200 makes a report to the base station 100 and the base station 100 considers that a favorable beam is found, the terminal apparatus 200 is able to expect that recovery beam sweeping does not occur thereafter. The base station 100 may explicitly notify the terminal apparatus 200 that the subsequent recovery beam sweeping is stopped.

Operation Example 3

In a case where the beams between the base station 100 and the terminal apparatus 200 disappear due to the blocking, the base station 100 needs to promptly search for a direction in which the obstacle is absent. The beam management for such a purpose is different from the normal procedure, and it is necessary for the base station 100 to promptly grasp which direction is the different direction. It is difficult for the base station 100 to grasp the direction of a beam for avoiding an obstacle to the terminal apparatus 200. In a case where the blocking is the cause, it is highly likely that a beam in the direction similar to the direction of the currently used beam is similarly blocked. It is desired to reduce unnecessary beam sweeping under such a situation.

Figure 23:
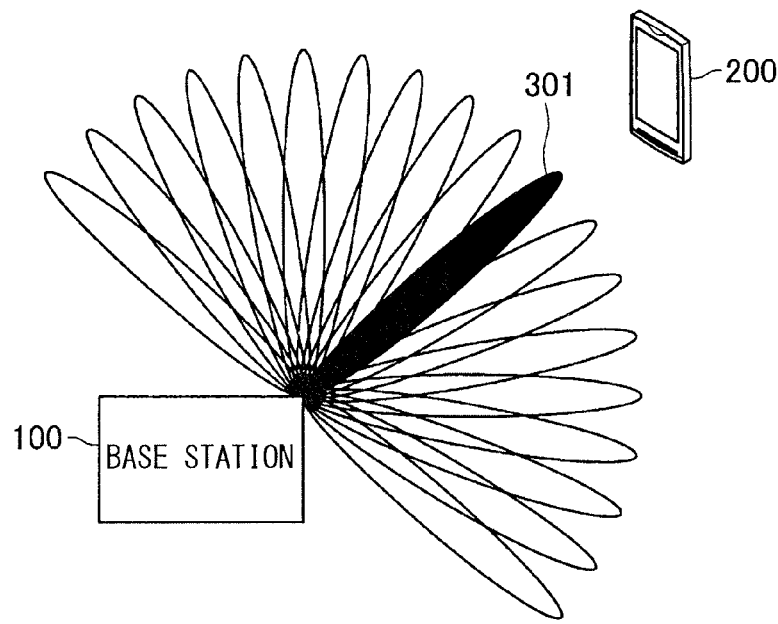
FIG. 23 is an explanatory diagram illustrating a situation before a beam from the base station 100 is subjected to blocking.
Figure 24:
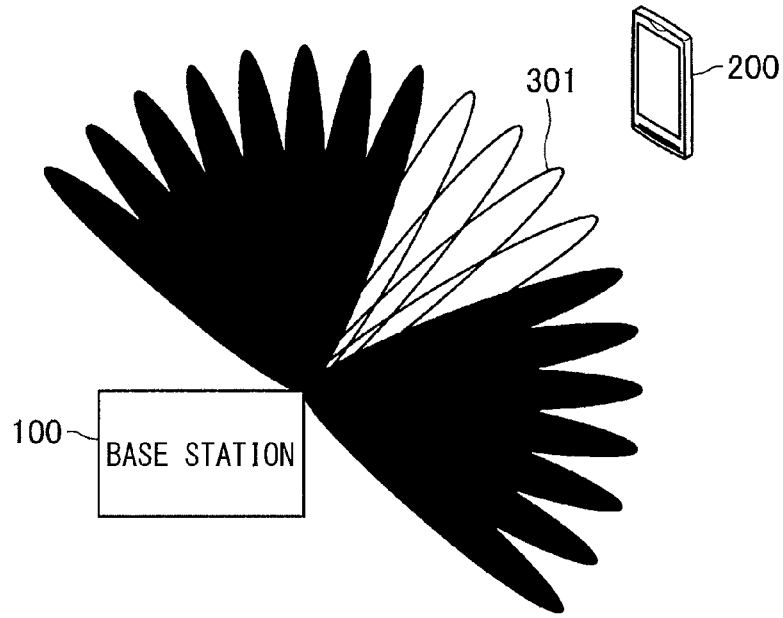
FIG. 24 is an explanatory diagram illustrating an example in which beam sweeping is performed by using a beam excluding beams near a beam in use.

Accordingly, in this operation example 3, the base station 100 provides the terminal apparatus 200 with recovery beam sweeping using a beam that avoids a beam near the currently used beam, in a case where it is determined that the beam recovery request from the terminal apparatus 200 is based on blocking. FIG. 23 illustrates a situation before a beam from the base station 100 is subjected to blocking. A reference sign 301 denotes a beam used for communication between the base station 100 and the terminal apparatus 200. After blocking occurs, it is highly likely useless for the base station 100 to try recovery beam sweeping by using a beam close to this beam 301. The base station 100 may thus perform beam sweeping by using a beam that excludes the beam close to the beam 301. FIG. 24 is an explanatory diagram illustrating an example in which the base station 100 performs beam sweeping by using a beam that excludes a beam close to the beam 301. This recovery beam sweeping pattern is referred to as pattern A.

Figure 25:
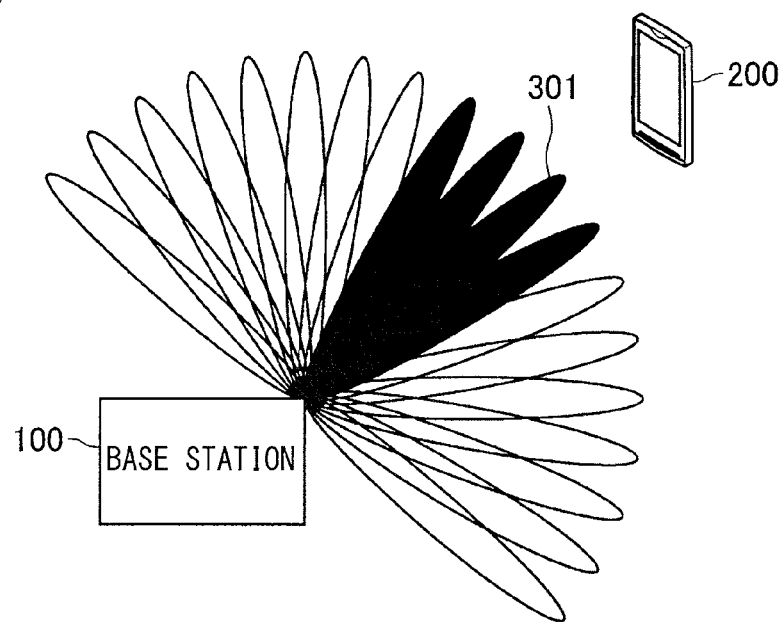
FIG. 25 is an explanatory diagram illustrating an example in which beam sweeping is performed by using a beam near the beam in use.

In addition, there may be a case where a simple failure in updating the beam due to a tracking mistake or the like causes an optimal beam to be present near the currently used beam. In this case, it is more favorable to perform beam sweeping again near the beam in use, and to select again the optimal beam. FIG. 25 is an explanatory diagram illustrating an example in which beam sweeping is performed by using a beam near the beam 301. This recovery beam sweeping pattern is referred to as pattern B. It is important for the base station 100 to select whether to perform beam sweeping again by using a beam near the beam used so far or to perform beam sweeping again by using a beam excluding the nearby beam in response to a situation in which communication using a beam results in failure.

In a case where the base station 100 selects in which of the patterns A and B recovery beam sweeping is performed, it is desirable that the terminal apparatus 200 feed back information for the base station 100 for the selection. The information sent from the terminal apparatus 200 to the base station 100 is, for example, RSRPs of a plurality of beams. Specifically, the terminal apparatus 200 sends the base station 100 RSRPs for a plurality of beams near the beam in use. When the reception levels of all the RSRPs are significantly lowered, the base station 100 is able to determine that it is more favorable to perform the recovery beam sweeping of the pattern A. Meanwhile, in a case where an allowable RSRP is mixed in a plurality of RSRPs, the base station 100 determines that the tracking is not successful during the beam tracking, and it is effective for the beam recovery to perform again the recovery beam sweeping according to the pattern B.

Figure 26:
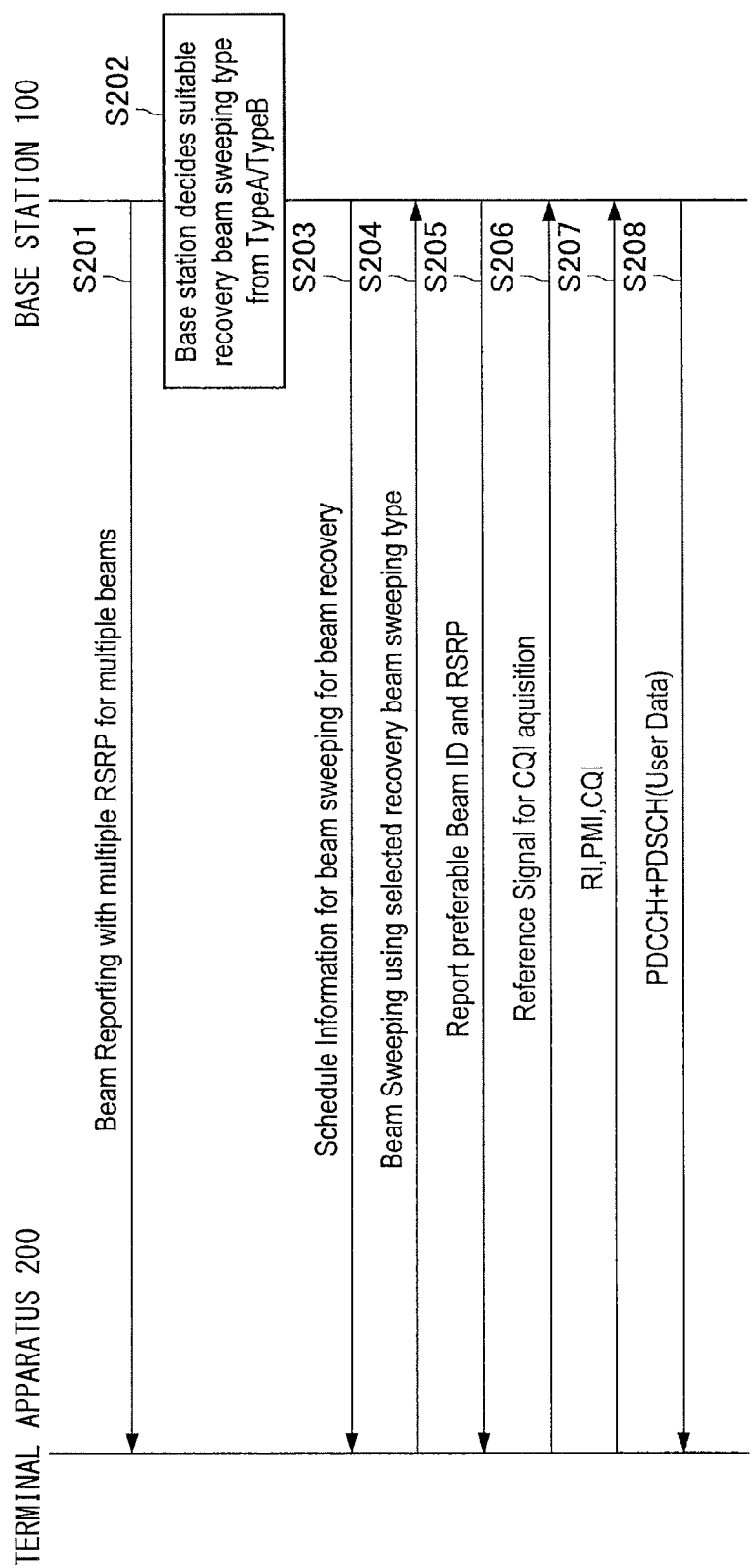
FIG. 26 is an explanatory diagram illustrating operation examples of the base station 100 and the terminal apparatus 200 according to the embodiment as a sequence diagram.

FIG. 26 is an explanatory diagram illustrating operation examples of the base station 100 and the terminal apparatus 200 according to the present embodiment as a sequence diagram. The terminal apparatus 200 sends the base station 100 RSRPs for a plurality of beams near the beam in use (step S201). The base station 100 decides in which of the patterns A and B recovery beam sweeping is executed, on the basis of the information from the terminal apparatus 200 (step S202).

Subsequently, the base station 100 transmits schedule information for performing recovery beam sweeping in the pattern decided in step S202 to the terminal apparatus 200

(step S203). Then, the base station 100 performs recovery beam sweeping in the pattern decided in step S202 on the basis of the schedule information (step S204). The terminal apparatus 200 receives beams transmitted from the base station 100 and reports the beam ID and RSRP of the appropriate beam (step S205).

When an optimal beam is found through the recovery beam sweeping in the pattern decided in step S202, the base station 100 transmits a reference signal (Reference Signal) for CQI acquisition to the terminal apparatus 200 (step S206). Subsequently, the terminal apparatus 200 transmits the RI (Rank Indicator), PMI (Precoding Matrix Indicator), and CQI (Channel Quality Indicator) of the received beam to the base station 100 (step S207). The base station 100 then transmits user data in PDCCH and PDSCH by using the optimal beam (step S208).

If the optimal beam is not found through recovery beam sweeping in the pattern decided in step S202, the base station 100 may execute recovery beam sweeping in the pattern that is not the pattern decided in step S202. That is, if the optimal beam is not found through the recovery beam sweeping according to the pattern A first, the base station 100 may subsequently execute the recovery beam sweeping according to the pattern B.

Operation Example 4

In the normal beam management, the base station 100 performs beam sweeping, and the terminal apparatus 200 selects an appropriate beam therefrom. The terminal apparatus 200 feeds back a value such as the RSRP representing the beam quality to the base station 100 together with the beam number of the selected beam. Receiving the result of the report from the terminal apparatus 200, the base station 100 decides a beam and transitions to an operation for transmitting user data by using the beam. Specifically, after the beam of interest is decided by the beam management, the detailed channel quality of the beam is further measured. The purpose of the beam management is only to decide a beam, and the base station 100 thus transmits the beam by using one port or at most two ports as the antenna ports, and measures the RSRP that is a power value in the terminal apparatus 200.

Meanwhile, in the CQI acquisition, the base station 100 transmits the reference signals by using the beam at the 2/4/8 antenna ports to provide a 2-layer or 4-layer/8-layer MIMO on the transmission side. In the terminal apparatus 20, it is decided what Rank Indication (how many layers it is possible to use for MIMO) is favorable in the situation, and what CQI (modulation scheme) at that time is favorable. Further, fine adjustment of antenna weights used on the transmission side is also performed. Such kinds of information are reported from the terminal apparatus 200 to the base station 100. This series of flows is CQI acquisition. It is possible to transmit the user data after the CQI acquisition is completed.

Again, performing CQI acquisition on the decided beam after all beam sweeping is finished is a very time-consuming procedure for both the base station 100 and the terminal apparatus 200. This method is not desirable when prompt beam recovery is required after links of beams are lost. In the conventional procedures sometimes result in large delays and signal disruption. The conventional procedures are not desirable procedures for reliable and low-delay communication (e.g., communication for controlling cars and drones from a network).

Therefore, in this operation example 4, a method is demonstrated of concurrently performing beam sweeping and CQI acquisition to shorten the time required for the beam recovery.

Figure 27:
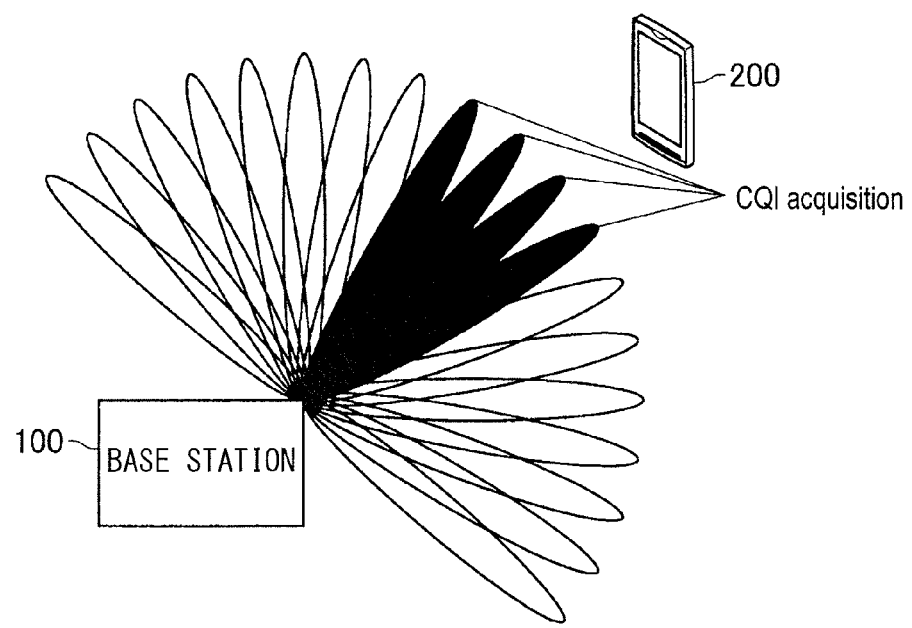
FIG. 27 is an explanatory diagram illustrating an example of recovery beam sweeping by the base station 100.

FIG. 27 is an explanatory diagram illustrating an example of recovery beam sweeping by the base station 100. FIG. 27 illustrates that recovery beam sweeping is performed by using four beams. In the example illustrated in FIG. 27, recovery beam sweeping is performed on the beam for performing beam recovery while signals equivalent to CQI acquisition are transmitted from the base station 100 to enable CQI acquisition of the MIMO of rank 2 or rank 4. Performing recovery beam sweeping in this manner makes it possible to concurrently perform beam sweeping and CQI acquisition, allowing for prompt beam restoration.

To perform this procedure, the base station 100 indicates to the terminal apparatus 200 that the procedure is performed in which the beam management and the CQI acquisition are mixed, and then sets resources for making reports for different beams together with the respective CQI acquisition. The terminal apparatus 200 is able to report the RI, the PMI, and the CQI to the base station 100 together with the beam number. As the operation of the base station 100, the reports described above may be received for all beams, or the sweeping of the CQI acquisition may be stopped at the time of confirming the appropriate quality.

Figure 28:
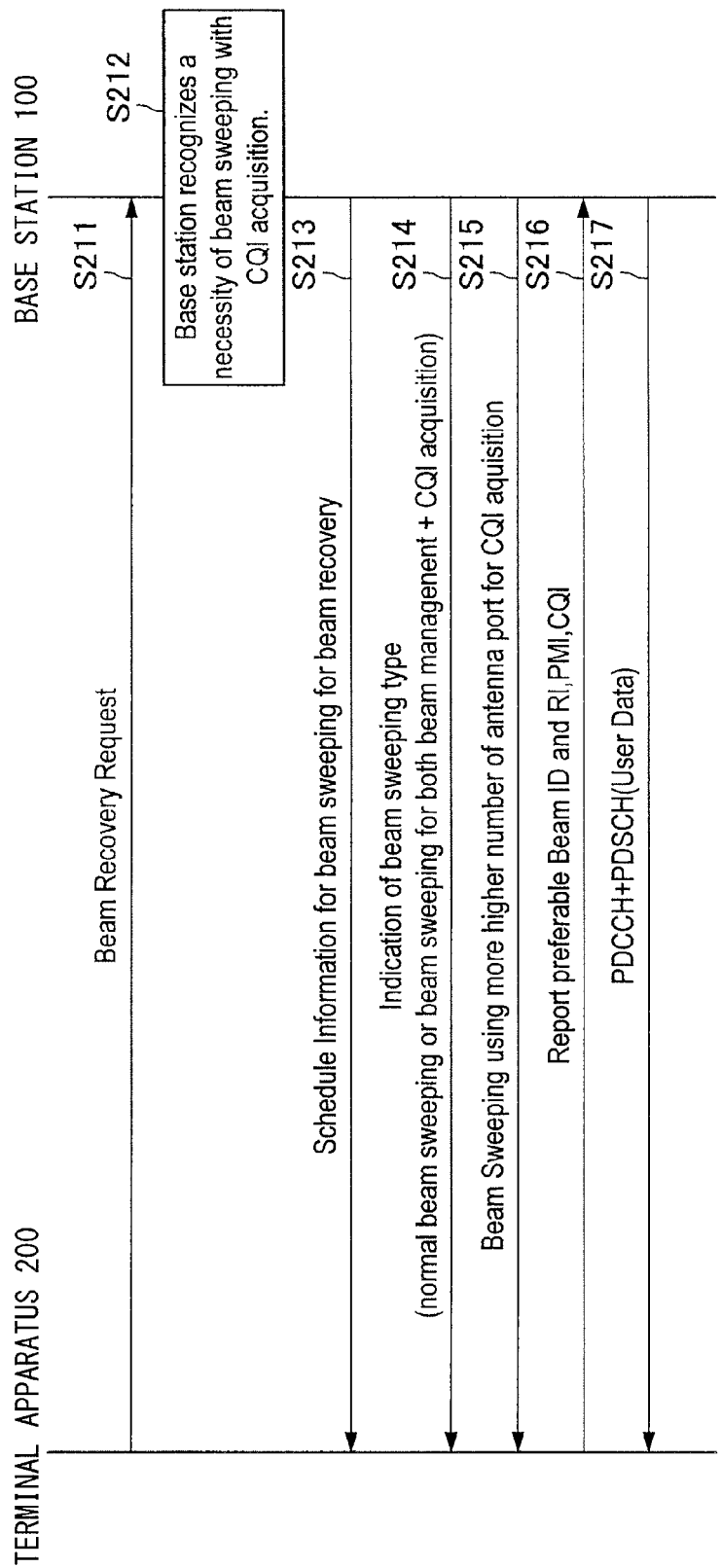
FIG. 28 is an explanatory diagram illustrating operation examples of the base station 100 and the terminal apparatus 200 according to the embodiment as a sequence diagram.

FIG. 28 is an explanatory diagram illustrating operation examples of the base station 100 and the terminal apparatus 200 according to the present embodiment as a sequence diagram. When a beam recovery request is sent from the terminal apparatus 200 to the base station 100 (step S211), the base station 100 recognizes that beam recovery is necessary (step S212). Here, it is assumed that the base station 100 decides that the procedure is performed in which beam management and CQI acquisition are mixed when performing beam recovery.

The base station 100 transmits schedule information for performing recovery beam sweeping to the terminal apparatus 200 (step S213). Subsequently, the base station 100 notifies the terminal apparatus 200 whether to perform the normal recovery beam sweeping or perform the recovery beam sweeping in which the beam management and the CQI acquisition are mixed (step S214).

The base station 100 then executes beam sweeping using the largest number of antenna ports for CQI acquisition for the terminal apparatus 200 (step S215). Subsequently, the terminal apparatus 200 transmits the RI (Rank Indicator), PMI (Precoding Matrix Indicator), and CQI (Channel Quality Indicator) of the received beam to the base station 100 (step S216). The base station 100 then transmits user data in PDCCH and PDSCH by using the optimal beam (step S217).

The operation example illustrated in FIG. 28 is characterized in that the number of antenna ports at the time of normal beam sweeping is different from the number of antenna ports at the time of recovery beam sweeping. An antenna port is a virtual antenna, and one reference signal is used for one antenna port. Antenna ports are guaranteed orthogonality between resources at different time/frequencies or codes. The number of antenna ports at the time of normal beam sweeping is 1 or 2, but the number of antenna ports at the time of recovery beam sweeping is 4 or more. The contents of a report for beam sweeping are also different between normal beam sweeping and recovery beam sweeping. Normally, a Beam Index and RSRP, and RSRQ or the like in addition thereto are reported to the base station 100 from the terminal apparatus 200. In addition to the above, RI, PMI and CQI are reported in a report for recovery beam sweeping. In this manner, changing the number of antenna ports or changing the contents to be reported between normal beam sweeping and recovery beam sweeping makes rapid recovery possible.

The most important operation in the series of operations illustrated in FIG. 28 is the operation in step S214 above for the base station 100 to notify the terminal apparatus 200 whether the beam sweeping is normal beam sweeping or beam sweeping performed concurrently with CQI acquisition.

2. APPLICATION EXAMPLES

The technology according to the present disclosure is applicable to various products. For example, the base station 100 may be achieved as any type of eNB (evolved Node B) such as a macro eNB or a small eNB. The small eNB may be an eNB such as a pico eNB, a micro eNB, or a home (femto) eNB that covers a cell smaller than a macro cell. Instead, the base station 100 may be achieved as another type of base station such as a NodeB or a BTS (Base Transceiver Station). The base station 100 may include a main entity (also referred to as base station apparatus) that controls wireless communication, and one or more RRHs (Remote Radio Heads) disposed in places different from the place of the main entity. In addition, various types of terminals to be described below may operate as the base station 100 by executing a base station function temporarily or permanently.

In addition, for example, the terminal apparatus 200 may be achieved as a mobile terminal such as a smartphone, tablet PC (Personal Computer), notebook PC, a portable game terminal, a portable/dongle mobile router, or a digital camera, or an onboard terminal such as a car navigation apparatus. In addition, the terminal apparatus 2200 may be achieved as a terminal (also referred to as MTC (Machine Type Communication) terminal) that performs M2M (Machine To Machine) communication. Further, the terminal apparatus 2200 may include wireless communication modules (e.g., integrated circuit module including one die) mounted on these terminals.
(Application Examples for Base Station)

First Application Example

Figure 29:
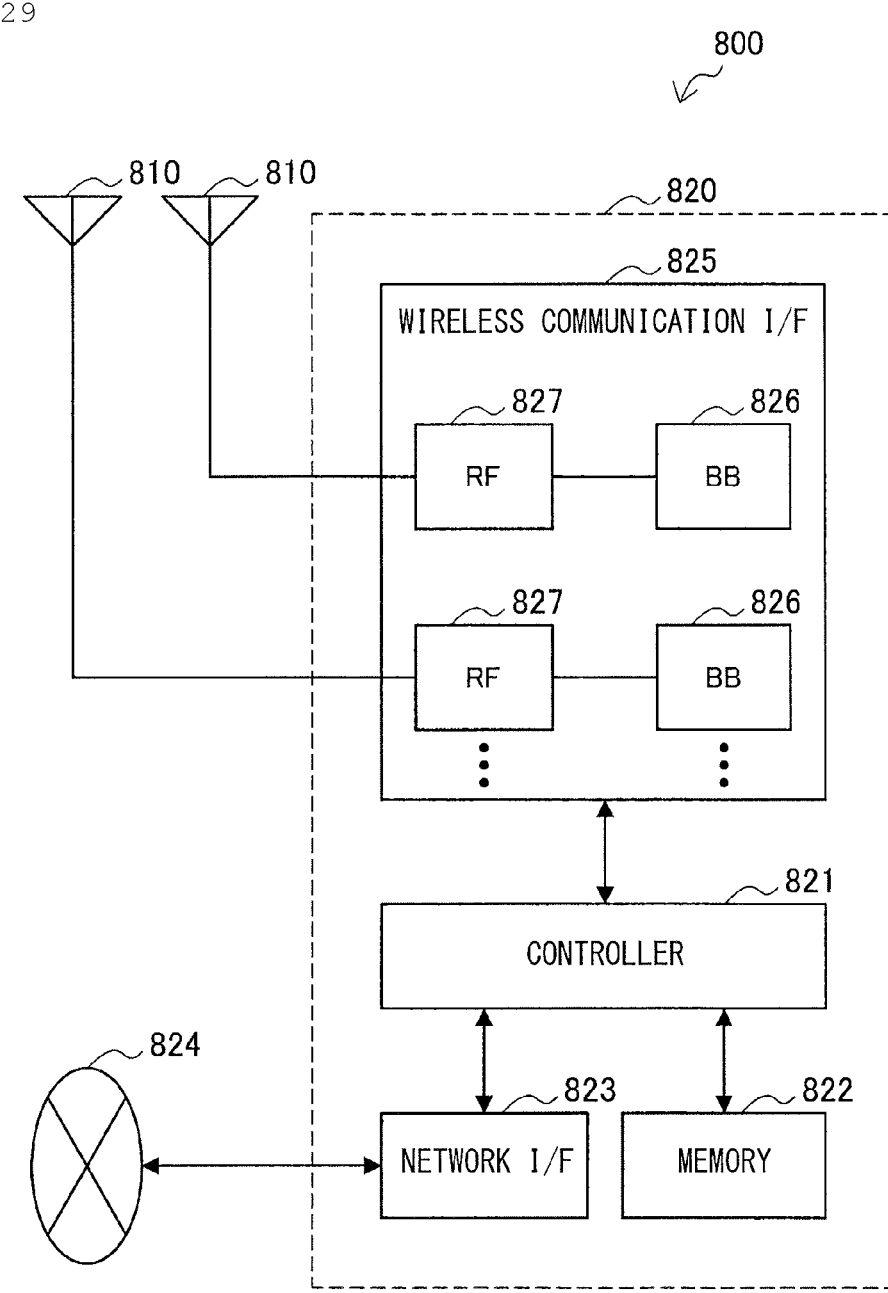
FIG. 29 is a block diagram illustrating a first example of a schematic configuration of an eNB to which technology according to the present disclosure may be applied.

FIG. 29 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be coupled to each other via an RF cable.

Each of the antennas 810 includes a single or a plurality of antenna elements (e.g., a plurality of antenna elements included in a MIMO antenna), and is used for the base station apparatus 820 to transmit and receive wireless signals. The eNB 800 may include the plurality of antennas 810 as illustrated in FIG. 29, and the plurality of respective antennas 810 may correspond, for example, to a plurality of frequency bands used by the eNB 800. It should be noted that FIG. 29 illustrates an example in which the eNB 800 includes the plurality of antennas 810, but the eNB 800 may include the single antenna 810.

The base station apparatus 820 includes a controller 821, a memory 822, a network interface 823, and a wireless communication interface 825.

The controller 821 may be, for example, CPU or DSP, and operates various functions of a higher layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors, and transfer the generated bundled packet. In addition, the controller 821 may also have a logical function of executing control such as radio resource control (Radio Resource Control), radio bearer control (Radio Bearer Control), mobility management (Mobility Management), admission control (Admission Control), or scheduling (Scheduling). In addition, the control may be executed in cooperation with nearby eNB or a core network node. The memory 822 includes RAM and ROM, and stores a program executed by the controller 821 and various kinds of control data (e.g., terminal list, transmission power data, scheduling data, and the like).

The network interface 823 is a communication interface for coupling the base station apparatus 820 to a core network 824. The controller 821 may communicate with a core network node or another eNB via the network interface 823. In this case, the eNB 800 and the core network node or the other eNB may be coupled to each other through a logical interface (e.g., S1 interface or X2 interface). The network interface 823 may be a wired communication interface or a wireless communication interface for wireless backhaul. In a case where the network interface 823 is a wireless communication interface, the network interface 823 may use a higher frequency band for wireless communication than a frequency band used by the wireless communication interface 825.

The wireless communication interface 825 supports any cellular communication scheme such as LTE (Long Term Evolution) or LTE-Advanced, and provides wireless coupling to a terminal positioned within the cell of the eNB 800 via the antenna 810. The wireless communication interface 825 may typically include a base band (BB) processor 826, an RF circuit 827, and the like. The BB processor 826 may perform, for example, encoding/decoding, modulation/demodulation, multiplexing/demultiplexing, and the like, and executes various signal processing of each of layers (e.g., L1, MAC (Medium Access Control), RLC (Radio Link Control), and PDCP (Packet Data Convergence Protocol)). The BB processor 826 may have a portion or all of the logical functions described above instead of the controller 821. The BB processor 826 may be a module including a memory having a communication control program stored therein, a processor to execute the program, and a related circuit, and the function of the BB processor 826 may be modifiable by updating the program described above. In addition, the module described above may be a card or blade to be inserted into a slot of the base station apparatus 820, or a chip mounted on the card or blade described above. Meanwhile, the RF circuit 827 may include a mixer, a filter, an amplifier, and the like, and transmits and receives wireless signals via the antenna 810.

The wireless communication interface 825 may include the plurality of BB processors 826 as illustrated in FIG. 29, and the plurality of respective BB processors 826 may correspond, for example, to a plurality of frequency bands used by the eNB 800. In addition, the wireless communication interface 825 may also include the plurality of RF circuits 827 as illustrated in FIG. 29, and the plurality of respective RF circuits 827 may correspond, for example, to a plurality of antenna elements. It should be noted that FIG. 29 illustrates an example in which the wireless communication interface 825 includes the plurality of BB processors 826 and the plurality of RF circuits 827, but the wireless communication interface 825 may also include the single BB processor 826 or the single RF circuit 827.

In the eNB 800 illustrated in FIG. 29, one or more components (e.g., processing unit 150) included in the base station 100 described with reference to FIG. 10 may be implemented in the wireless communication interface 825. Alternatively, at least a portion of these components may be implemented in the controller 821. As an example, the eNB 800 may include a module including a portion (e.g., BB processor 826) or all of components of the wireless communication interface 825 and/or the controller 821, and the one or more components described above may be implemented in the module. In this case, the module described above may store a program for causing a processor to function as the one or more components described above (i.e., a program for causing a processor to execute the operations of the one or more components described above) and execute the program. As another example, a program for causing a processor to function as the one or more components described above may be installed in the eNB 800, and the wireless communication interface 825 (e.g., BB processor 826) and/or the controller 821 may execute the program. As described above, the eNB 800, the base station apparatus 820, or the module described above may be provided as an apparatus including the one or more components described above, and the program for causing a processor to function as the one or more components described above may be provided. In addition, a readable recording medium having the above-described program recorded thereon may be provided.

In addition, the wireless communication unit 120 described with reference to FIG. 10 may be implemented in the wireless communication interface 825 (e.g., RF circuit 827) in the eNB 800 illustrated in FIG. 29. In addition, the antenna unit 110 may be implemented in the antenna 810. In addition, the interface between the processing unit 240 and a higher node or another base station apparatus may be implemented in the controller 821 and/or the network interface 823.

Second Application Example

Figure 30:
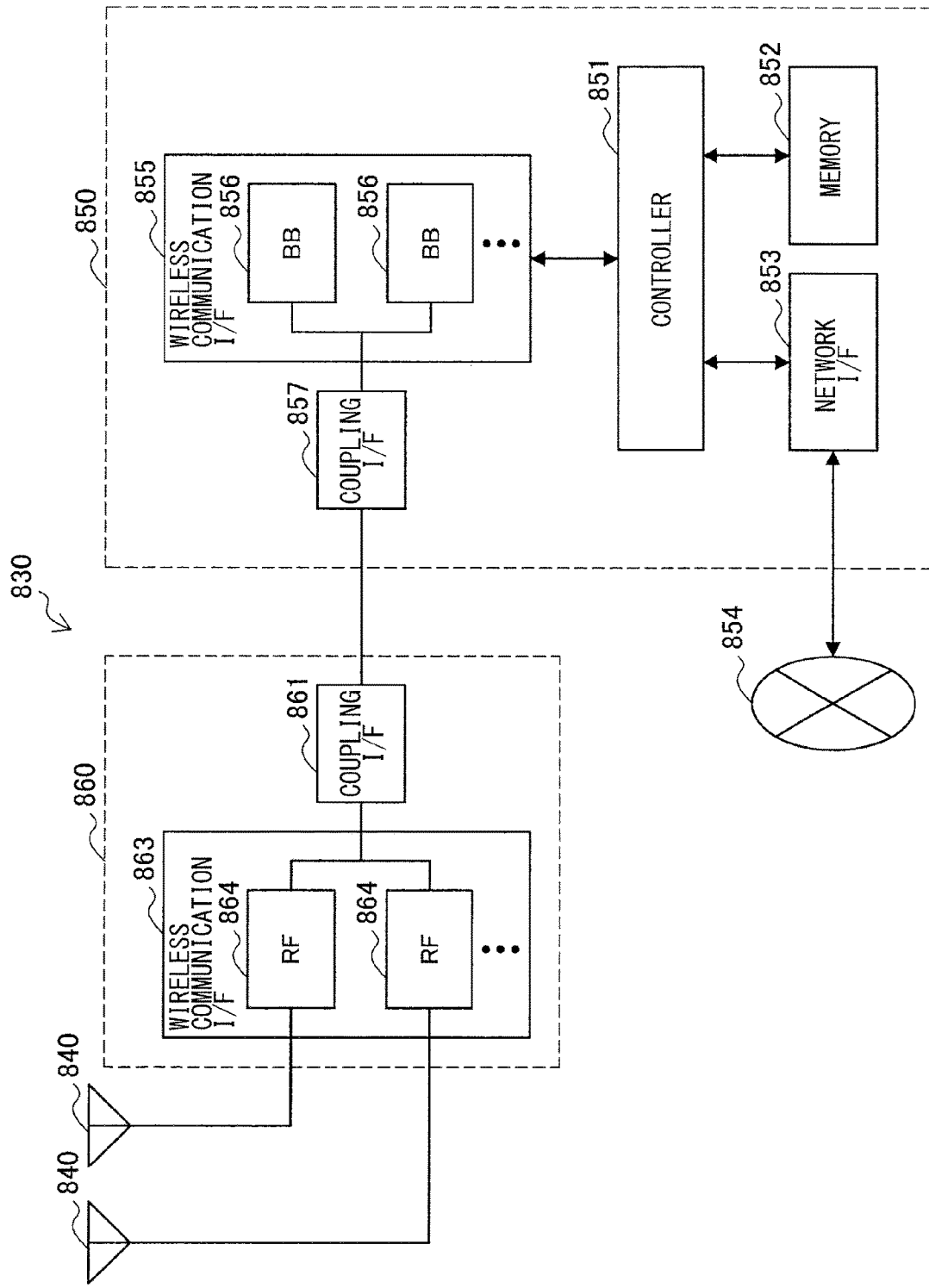
FIG. 30 is a block diagram illustrating a second example of the schematic configuration of the eNB to which technology according to the present disclosure may be applied.

FIG. 30 is a block diagram illustrating a second example of a schematic configuration of an eNB to which the technology according to the present disclosure may be applied. An eNB 830 includes one or more antennas 840, a base station apparatus 850, and RRH 860. Each antenna 840 and the RRH 860 may be coupled to each other via an RF cable. In addition, the base station apparatus 850 and the RRH 860 may be coupled to each other through a high-speed line such as an optical fiber cable.

Each of the antennas 840 includes a single or a plurality of antenna elements (e.g., a plurality of antenna elements included in a MIMO antenna), and is used for the RRH 860 to transmit and receive wireless signals. The eNB 830 may include the plurality of antennas 840 as illustrated in FIG. 30, and the plurality of respective antennas 840 may correspond, for example, to a plurality of frequency bands used by the eNB 830. It should be noted that FIG. 30 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a coupling interface 857. The controller 851, the memory 852, and the network interface 853 are similar to the controller 821, the memory 822, and the network interface 823 described with reference to FIG. 29.

The wireless communication interface 855 supports any cellular communication scheme such as LTE or LTE-Advanced, and provides wireless coupling to a terminal positioned in a sector corresponding to the RRH 860 via the RRH 860 and the antenna 840. The wireless communication interface 855 may typically include a BB processor 856 and the like. The BB processor 856 is similar to the BB processor 826 described with reference to FIG. 29 except that the BB processor 856 is coupled to an RF circuit 864 of the RRH 860 via the coupling interface 857. The wireless communication interface 855 may include the plurality of BB processors 856 as illustrated in FIG. 30, and the plurality of respective BB processors 856 may correspond, for example, to a plurality of frequency bands used by the eNB 830. It should be noted that FIG. 30 illustrates an example in which the wireless communication interface 855 includes the plurality of BB processors 856, but the wireless communication interface 855 may also include the single BB processor 856.

The coupling interface 857 is an interface for coupling the base station apparatus 850 (wireless communication interface 855) to the RRH 860. The coupling interface 857 may be a communication module for communication on the above-described high-speed line in which couples the base station apparatus 850 (wireless communication interface 855) and the RRH 860 to each other.

In addition, the RRH 860 includes a coupling interface 861 and a wireless communication interface 863.

The coupling interface 861 is an interface for coupling the RRH 860 (wireless communication interface 863) to the base station apparatus 850. The coupling interface 861 may be a communication module for communication on the high-speed line described above.

The wireless communication interface 863 transmits and receives wireless signals via the antenna 840. The wireless communication interface 863 may typically include the RF circuit 864 and the like. The RF circuit 864 may include a mixer, a filter, an amplifier, and the like, and transmits and receives wireless signals via the antenna 840. In addition, the wireless communication interface 863 may also include the plurality of RF circuits 864 as illustrated in FIG. 30, and the plurality of respective RF circuits 864 may correspond, for example, to a plurality of antenna elements. It should be noted that FIG. 30 illustrates an example in which the wireless communication interface 863 includes the plurality of RF circuits 864, but the wireless communication interface 863 may also include the single RF circuit 864.

In the eNB 830 illustrated in FIG. 30, one or more components (e.g., processing unit 150) included in the base station 100 described with reference to FIG. 10 may be implemented in the wireless communication interface 855 and/or the wireless communication interface 863. Alternatively, at least a portion of these components may be implemented in the controller 851. As an example, the eNB 830 may include a module including a portion (e.g., BB processor 856) or all of components of the wireless communication interface 855 and/or the controller 851, and the one or more components described above may be implemented in the module. In this case, the module described above may store a program for causing a processor to function as the one or more components described above (i.e., a program for causing a processor to execute the operations of the one or more components described above) and execute the program. As another example, a program for causing a processor to function as the one or more components described above may be installed in the eNB 830, and the wireless communication interface 855 (e.g., BB processor 856) and/or the controller 851 may execute the program. As described above, the eNB 830, the base station apparatus 850, or the module described above may be provided as an apparatus including the one or more components described above, and the program for causing a processor to function as the one or more components described above may be provided. In addition, a readable recording medium having the above-described program recorded thereon may be provided.

In addition, the wireless communication unit 120 described with reference to FIG. 10 may be implemented in the wireless communication interface 825 (e.g., RF circuit 827) in the eNB 830 illustrated in FIG. 30. In addition, the antenna unit 110 may be implemented in the antenna 810. In addition, the interface between the processing unit 240 and a higher node or another base station apparatus may be implemented in the controller 821 and/or the network interface 823.

(Application Examples for Terminal Apparatus)

First Application Example

Figure 31:
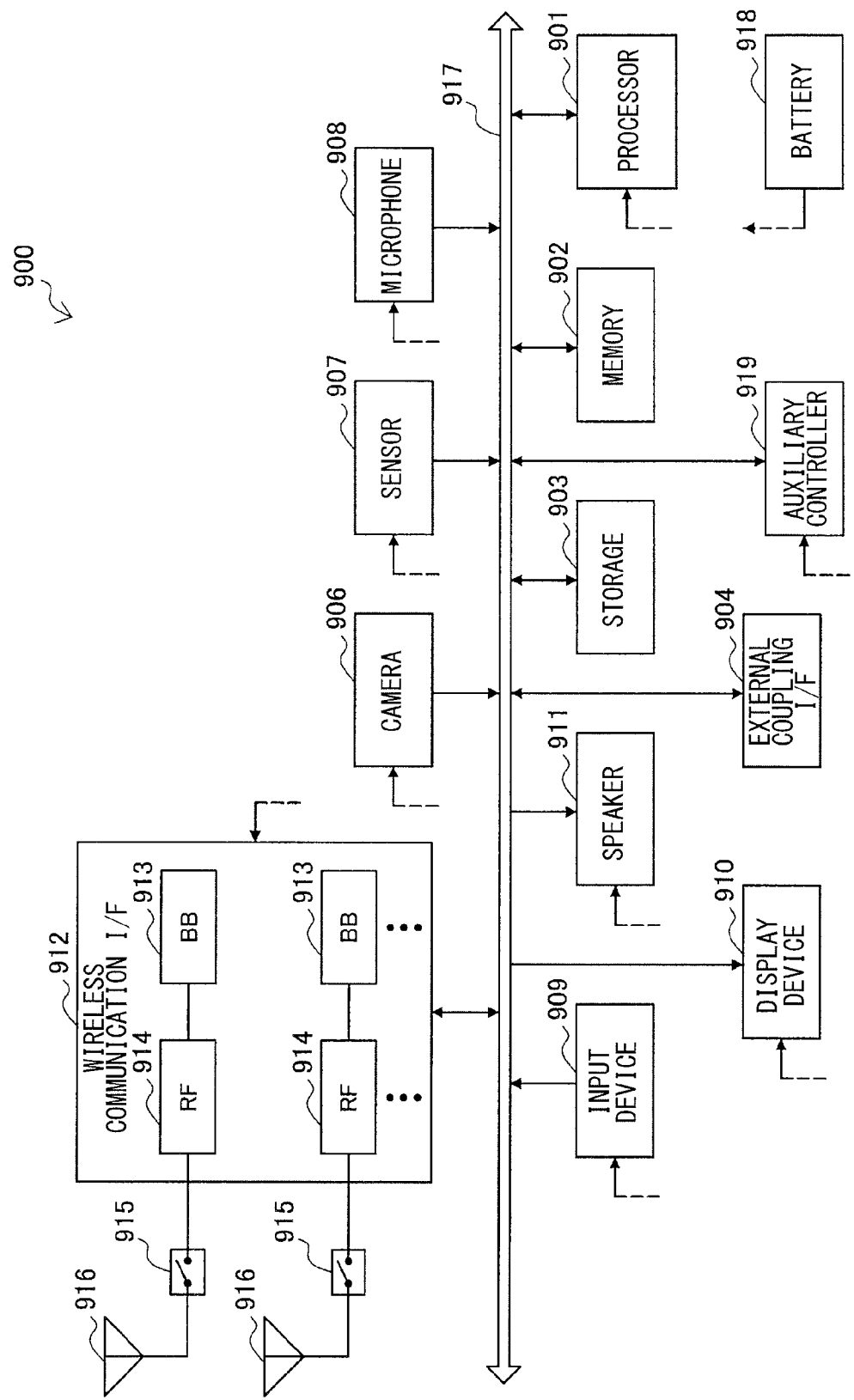
FIG. 31 is a block diagram illustrating an example of a schematic configuration of a smartphone 900 to which the technology according to the present disclosure may be applied.

FIG. 31 is a block diagram illustrating an example of a schematic configuration of a smartphone 900 to which the technology according to the present disclosure may be applied. The smartphone 900 includes a processor 901, a memory 902, a storage 903, an external coupling interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, CPU or SoC (System on Chip), and controls functions of an application layer and another layer of the smartphone 900. The memory 902 includes RAM and ROM, and stores a program that is executed by the processor 901, and data. The storage 903 may include a storage medium such as a semiconductor memory or a hard disk. The external coupling interface 904 is an interface for coupling an externally attached device such as a memory card or a USB (Universal Serial Bus) device to the smartphone 900.

The camera 906 includes, for example, an imaging element such as CCD (Charge Coupled Device) or CMOS (Complementary Metal Oxide Semiconductor), and generates a captured image. The sensor 907 may include a sensor group including, for example, a positioning sensor, a gyro sensor, a geomagnetic sensor, an acceleration sensor, and the like. The microphone 908 converts a sound that is inputted into the smartphone 900 to a sound signal. The input device 909 includes, for example, a touch sensor that detects a touch onto a screen of the display device 910, a keypad, a keyboard, a button, a switch, or the like, and receives an operation or an information input from a user. The display device 910 includes a screen such as a liquid crystal display (LCD) or an organic light-emitting diode (OLED) display, and displays an output image of the smartphone 900. The speaker 911 converts the sound signal that is outputted from the smartphone 900 to a sound.

The wireless communication interface 912 supports any cellular communication scheme such as LTE or LTE-Advanced, and executes wireless communication. The wireless communication interface 912 may typically include a BB processor 913, an RF circuit 914, and the like. The BB processor 913 may perform, for example, encoding/decoding, modulation/demodulation, multiplexing/demultiplexing, and the like, and executes various kinds of signal processing for wireless communication. Meanwhile, the RF circuit 914 may include, for example, a mixer, a filter, an amplifier, and the like, and transmits and receives wireless signals via the antenna 916. The wireless communication interface 912 may also be a one-chip module that has the BB processor 913 and the RF circuit 914 integrated thereon. The wireless communication interface 912 may include the plurality of BB processors 913 and the plurality of RF circuits 914 as illustrated in FIG. 31. It should be noted that FIG. 31 illustrates an example in which the wireless communication interface 912 includes the plurality of BB processors 913 and the plurality of RF circuits 914, but the wireless communication interface 912 may include the single BB processor 913 or the single RF circuit 914.

Further, in addition to a cellular communication scheme, the wireless communication interface 912 may support another type of wireless communication scheme such as a short-distance wireless communication scheme, a near field communication scheme, or a wireless LAN (Local Area Network) scheme. In that case, the wireless communication interface 912 may include the BB processor 913 and the RF circuit 914 for each wireless communication scheme.

Each of the antenna switches 915 switches coupling destinations of the antennas 916 between the plurality of circuits (e.g., circuit for different wireless communication schemes) included in the wireless communication interface 912.

Each of the antennas 916 includes a single or a plurality of antenna elements (e.g., a plurality of antenna elements included in a MIMO antenna), and is used for the wireless communication interface 912 to transmit and receive wireless signals. The smartphone 900 may include the plurality of antennas 916 as illustrated in FIG. 31. It should be noted that FIG. 31 illustrates an example in which the smartphone 900 includes the plurality of antennas 916, but the smartphone 900 may include the single antenna 916.

Further, the smartphone 900 may include the antenna 916 for each wireless communication scheme. In that case, the antenna switches 915 may be omitted from the configuration of the smartphone 900.

The bus 917 couples the processor 901, the memory 902, the storage 903, the external coupling interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 31 via a power supply line that is partially illustrated in the diagram as a dashed line. The auxiliary controller 919, for example, operates a minimally necessary function of the smartphone 900 in a sleep mode.

In the smartphone 900 illustrated in FIG. 31, one or more components (e.g., processing unit 240) included in the terminal apparatus 200 described with reference to FIG. 11 may be implemented in the wireless communication interface 912. Alternatively, at least a portion of these components may be implemented in the processor 901 or the auxiliary controller 919. As an example, the smartphone 900 may include a module including a portion (e.g., BB processor 913) or all of the wireless communication interface 912, the processor 901, and/or the auxiliary controller 919, and the one or more components may be implemented in the module. In this case, the module described above may store a program for causing a processor to function as the one or more components described above (i.e., a program for causing a processor to execute the operations of the one or more components described above) and execute the program. As another example, a program causing a processor to function as the one or more components described may be installed in the smartphone 900, and the wireless communication interface 912 (e.g., BB processor 913), the processor 901, and/or the auxiliary controller 919 may execute the program. As described above, the smartphone 900 or the module described above may be provided as an apparatus including the one or more components described above, and a program causing a processor to function as the one or more components described above may be provided. In addition, a readable recording medium having the above-described program recorded thereon may be provided.

In addition, for example, the wireless communication unit 220 described with reference to FIG. 11 may be implemented in the wireless communication interface 912 (e.g., RF circuit 914) in the smartphone 900 illustrated in FIG. 31. In addition, the antenna unit 210 may be implemented in the antenna 916.

Second Application Example

FIG. 32 is a block diagram illustrating an example of a schematic configuration of a car navigation apparatus 920 to which the technology according to the present disclosure may be applied. The car navigation apparatus 920 includes a processor 921, a memory 922, a GPS (Global Positioning System) module 924, a sensor 925, a data interface 926, a content player 927, a storage medium interface 928, art input device 929, a display device 930, a speaker 931, a wireless communication interface 933, one or more antenna switches 936, one or more antennas 937, and a battery 938.

The processor 921 may be, for example, CPU or SoC, and controls the navigation function and the other functions of the car navigation apparatus 920. The memory 922 includes RAM and ROM, and stores a program that is executed by the processor 921, and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor, and the like. The data interface 926 is, for example, coupled to an in-vehicle network 941 via a terminal that is not illustrated, and acquires data such as vehicle speed data generated on the vehicle side.

The content player 927 reproduces content stored in a storage medium (e.g., CD or DVD) to be inserted into the storage medium interface 928. The input device 929 includes, for example, a touch sensor that detects a touch onto a screen of the display device 930, a button, a switch, or the like, and receives an operation or an information input from a user. The display device 930 includes a screen such as LCD or an OLED display, and displays an image of the navigation function or content to be reproduced. The speaker 931 outputs a sound of the navigation function or content to be reproduced.

The wireless communication interface 933 supports any cellular communication scheme such as LTE or LTE-Advanced, and executes wireless communication. The wireless communication interface 933 may typically include a BB processor 934, an RF circuit 935, and the like. The BB processor 934 may perform, for example, encoding/decoding, modulation/demodulation, multiplexing/demultiplexing, and the like, and executes various kinds of signal processing for wireless communication. Meanwhile, the RF circuit 935 may include, for example, a mixer, a filter, an amplifier, and the like, and transmits and receives wireless signals via the antenna 937. The wireless communication interface 933 may also be a one-chip module that has the BB processor 934 and the RF circuit 935 integrated thereon. The wireless communication interface 933 may include the plurality of BB processors 934 and the plurality of RF circuits 935 as illustrated in FIG. 32. It should be noted that FIG. 32 illustrates an example in which the wireless communication interface 933 includes the plurality of BB processors 934 and the plurality of RF circuits 935, but the wireless communication interface 933 may include the single BB processor 934 or the single RF circuit 935.

Further, in addition to a cellular communication scheme, the wireless communication interface 933 may support another type of wireless communication scheme such as a short-distance wireless communication scheme, a near field communication scheme, or a wireless LAN scheme. In that case, the wireless communication interface 933 may include the BB processor 934 and the RF circuit 935 for each wireless communication scheme.

Each of the antenna switches 936 switches coupling destinations of the antennas 937 between the plurality of circuits (e.g., circuit for different wireless communication schemes) included in the wireless communication interface 933.

Each of the antennas 937 includes a single or a plurality of antenna elements (e.g., a plurality of antenna elements included in a MIMO antenna), and is used for the wireless communication interface 933 to transmit and receive wireless signals. The car navigation apparatus 920 may include the plurality of antennas 937 as illustrated in FIG. 32. It should be noted that FIG. 32 illustrates an example in which the car navigation apparatus 920 includes the plurality of antennas 937, but the car navigation apparatus 920 may include the single antenna 937.

Further, the car navigation apparatus 920 may include the antenna 937 for each wireless communication scheme. In that case, the antenna switches 936 may be omitted from the configuration of the car navigation apparatus 920.

The battery 938 supplies electric power to each block of the car navigation apparatus 920 illustrated in FIG. 32 via a power supply line that is partially illustrated in the diagram as a dashed line. In addition, the battery 938 accumulates the electric power supplied from the vehicle side.

In the car navigation apparatus 920 illustrated in FIG. 32, one or more components (e.g., processing unit 240) included in the terminal apparatus 200 described with reference to FIG. 11 may be implemented in the wireless communication interface 933. Alternatively, at least a portion of these components may be implemented in the processor 921. As an example, the car navigation apparatus 920 may include a module including a portion (e.g., BB processor 934) or all of the wireless communication interface 933, and/or the processor 921, and the one or more components described above may be implemented in the module. In this case, the module described above may store a program for causing a processor to function as the one or more components described above (i.e., a program for causing a processor to execute the operations of the one or more components described above) and execute the program. As another example, a program causing a processor to function as the one or more components described may be installed in the ear navigation apparatus 920, and the wireless communication interface 933 (e.g., BB processor 934) and/or the processor 921 may execute the program. As described above, the car navigation apparatus 920 or the module described above may be provided as an apparatus including the one or more components described above, and a program causing a processor to function as the one or more components described above may be provided. In addition, a readable recording medium having the above-described program recorded thereon may be provided.

In addition, for example, the wireless communication unit 220 described with reference to FIG. 11 may be implemented in the wireless communication interface 912 (e.g., RF circuit 914) in the car navigation apparatus 920 illustrated in FIG. 32. In addition, the antenna unit 210 may be implemented in the antenna 916.

In addition, the technology according to the present disclosure may also be achieved as an in-vehicle system (or vehicle) 940 including one or more blocks of the car navigation apparatus 920 described above, the in-vehicle network 941, and a vehicle-side module 942. The vehicle-side module 942 generates vehicle data such as vehicle speed, engine speed, and trouble information, and outputs the generated data to the in-vehicle network 941.

It should be noted that the eNB described in the description above may be a gNB (gNodeB or next Generation NodeB).

3. SUMMARY

As described above, according to the embodiment of the present disclosure, it is possible to provide the base station 100 that makes it possible to promptly and efficiently find a new beam in a case where it is not possible to perform communication by using a beam due to blocking, interference, or the like.

The respective steps in the processing executed by each apparatus described herein do not necessarily have to be performed chronologically in the order described as a sequence diagram or a flowchart. For example, the respective steps in the processing executed by each apparatus may be processed in order different from the order described as a flowchart, or may be processed in parallel.

In addition, it is possible to fabricate a computer program for causing hardware such as the CPU, ROM, and RAM built in each apparatus to implement the same functions as those of the components of each apparatus described above. In addition, it is possible to provide a storage medium having the computer program stored therein. In addition, configuring each of the functional blocks illustrated in the functional block diagrams by hardware makes it possible to allow the hardware to achieve a series of processes.

A preferred embodiment(s) of the present disclosure has/have been described above in detail with reference to the accompanying drawings, but the technical scope of the present disclosure is not limited to such an embodiment(s). It is apparent that a person having ordinary skill in the art of the present disclosure may arrive at various alterations and modifications within the scope of the technical idea described in the appended claims, and it is understood that such alterations and modifications naturally fall within the technical scope of the present disclosure.

Furthermore, the effects described herein are merely illustrative and exemplary, and not limitative. That is, the technology according to the present disclosure may exert other effects that are apparent to those skilled in the art from the description herein, in addition to the above-described effects or in place of the above-described effects.

It should be noted that the following configurations also fall within the technical scope of the present disclosure.

(1)
A communication apparatus including
a control unit that changes, for each of beam groups, setting of scanning for resetting communication with an apparatus, the communication being performed by using a directional beam, the scanning being performed by using the directional beam, the beam groups each including a plurality of the directional beams, the control unit performing allocation of resources to the plurality of beam groups at one time.

(2)
The communication apparatus according to (1), in which the control unit performs the allocation before the resetting.

(3)
The communication apparatus according to (1) or (2), in which the control unit sets the allocation to be performed from a temporal position relative to a trigger of the resetting.

(4)
The communication apparatus according to any of (1) to (3), in which the control unit notifies the apparatus of the allocation through communication using another component carrier.

(5)
The communication apparatus according to any of (1) to (3), in which the control unit notifies the apparatus of the allocation through communication using another partial band of an identical component carrier.

(6)
The communication apparatus according to any of (1) to (5), in which, if a report from the apparatus causes an appropriate directional beam to be found in a certain beam group, the control unit does not perform scanning in another beam group.

(7)
The communication apparatus according to any of (1) to (6), in which the control unit performs the resetting in order of beam groups having a smaller number of the directional beams.

(8)
The communication apparatus according to any of (1) to (6), in which the control unit selects a beam group to be used for the resetting on the basis of a request from the apparatus.

(9)
The communication apparatus according to any of (1) to (8), in which the control unit starts the resetting on the basis of reception of a predetermined notification from the apparatus.

(10)
The communication apparatus according to any of (1) to (8), in which the control unit starts the resetting on the basis that a predetermined notification from the apparatus is not received.

(11)
A communication apparatus including
a control unit that changes, for each of beam groups, setting of scanning for resetting communication with an apparatus, the communication being performed by using a directional beam, the scanning being performed by using the directional beam, the beam groups each including a plurality of the directional beams,
the control unit performing allocation of resources for reports of the scanning for the resetting from the apparatus at one time.

(12)
The communication apparatus according to (11), in which the control unit notifies the apparatus of the allocation through communication using another component carrier.

(13)

The communication apparatus according to (11), in which the control unit notifies the apparatus of the allocation through communication using another partial band of an identical component carrier. (14)

The communication apparatus according to any of (11) to (13), in which the control unit sets the allocation to be performed from a temporal position relative to a trigger of the resetting.

(15)

A communication apparatus including a control unit that changes, for each of beam groups, setting of scanning for resetting communication with an apparatus, the communication being performed by using a directional beam, the scanning being performed by using the directional beam, the beam groups each including a plurality of the directional beams, the control unit selecting, in the resetting, on the basis of a request from the apparatus, use of a beam group including a directional beam in a direction excluding a direction near the directional beam used for the communication with the apparatus before the resetting or use of a beam group including a directional beam in the direction near the directional beam used for the communication with the apparatus before the resetting.

(16)

The communication apparatus according to (15), in which the control unit performs the resetting, on the basis of the request from the apparatus, by using the beam group including the directional beam in the direction excluding the direction near the directional beam used for the communication with the apparatus before the resetting.

(17)

The communication apparatus according to (15), in which the control unit performs the resetting by using, in the resetting, further the beam group including the directional beam in the direction near the directional beam used for the communication with the apparatus before the resetting.

(18)

A communication apparatus including a control unit that changes, for each of beam groups, setting of scanning for resetting communication from an apparatus, the communication being performed by using a directional beam, the scanning being performed by using the directional beam, the beam groups each including a plurality of the directional beams, the control unit requesting the apparatus in the resetting to perform the resetting using a beam group including a directional beam in a direction excluding a direction near a directional beam used for communication with the apparatus before the resetting.

(19)

A communication apparatus including a control unit that performs setting of scanning for resetting communication with an apparatus, the communication being performed by using a directional beam, the scanning being performed by using the directional beam, the control unit performing, at one time, allocation of a resource to a beam group including a plurality of the directional beams and allocation of a resource for grasping a channel state of the communication performed by using the directional beam after the resetting.

(20)

The communication apparatus according to (19), in which the control unit notifies the apparatus whether to perform only the scanning for the resetting, or perform scanning for grasping the channel state in addition to the scanning for the resetting.

(21)

The communication apparatus according to (19) or (20), in which the channel state includes quality and an interference condition of the channel (22)

A communication method including changing, by a processor, for each of beam groups, setting of scanning for resetting communication with an apparatus, the communication being performed by using a directional beam, the scanning being performed by using the directional beam, the beam groups each including a plurality of the directional beams, the processor performing allocation of resources to the plurality of beam groups at one time.

(23)

A communication method including changing, by a processor, for each of beam groups, setting of scanning for resetting communication with an apparatus, the communication being performed by using a directional beam, the scanning being performed by using the directional beam, the beam groups each including a plurality of the directional beams, the processor performing allocation of resources for reports of the scanning for the resetting from the apparatus at one time.

(24)

A communication method including changing, by a processor, for each of beam groups, setting of scanning for resetting communication with an apparatus, the communication being performed by using a directional beam, the scanning being performed by using the directional beam, the beam groups each including a plurality of the directional beams, the processor selecting, in the resetting, on the basis of a request from the apparatus, use of a beam group including a directional beam in a direction excluding a direction near the directional beam used for the communication with the apparatus before the resetting or use of a beam group including a directional beam in the direction near the directional beam used for the communication with the apparatus before the resetting.

(25)

A communication method including changing, by a processor, for each of beam groups, setting of scanning for resetting communication from an apparatus, the communication being performed by using a directional beam, the scanning being performed by using the directional beam, the beam groups each including a plurality of the directional beams, the processor requesting the apparatus in the resetting to perform the resetting using a beam group including a directional beam in a direction excluding a direction near a directional beam used for communication with the apparatus before the resetting.

(26)

A communication method including performing, by a processor, setting of scanning for resetting communication with an apparatus, the communication being performed by using a directional beam, the scanning being performed by using the directional beam, the processor performing, at one time, allocation of a resource to a beam group including a plurality of the directional beams and allocation of a resource for grasping a channel state of the communication performed by using the directional beam after the resetting.

REFERENCE SIGNS LIST

100 Base station
200 Terminal apparatus

The invention claimed is:

1. A communication apparatus comprising
circuitry configured to implement
a control unit that changes, for each of beam groups, setting of scanning for resetting communication with an apparatus, the communication being performed by using a directional beam, the scanning being performed by using the directional beam, the beam groups each including a plurality of the directional beams,
the control unit performing allocation of resources to the plurality of beam groups at one time,
wherein the control unit performs the resetting in order of beam groups having a smaller number of the directional beams.

2. The communication apparatus according to claim 1, wherein the control unit performs the allocation before the resetting.

3. The communication apparatus according to claim 1, wherein the control unit sets the allocation to be performed from a temporal position relative to a trigger of the resetting.

4. The communication apparatus according to claim 1, wherein the control unit notifies the apparatus of the allocation through communication using another component carrier.

5. The communication apparatus according to claim 1, wherein the control unit notifies the apparatus of the allocation through communication using another partial band of an identical component carrier.

6. The communication apparatus according to claim 1, wherein, if a report from the apparatus causes an appropriate directional beam to be found in a certain beam group, the control unit does not perform scanning in another beam group.

7. The communication apparatus according to claim 1, wherein the control unit selects a beam group to be used for the resetting on a basis of a request from the apparatus.

8. The communication apparatus according to claim 1, wherein the control unit starts the resetting on a basis of reception of a predetermined notification from the apparatus.

9. The communication apparatus according to claim 1, wherein the control unit starts the resetting on a basis that a predetermined notification from the apparatus is not received.

10. A communication apparatus comprising
circuitry configured to implement
a control unit that changes, for each of beam groups, setting of scanning for resetting communication with an apparatus, the communication being performed by using a directional beam, the scanning being performed by using the directional beam, the beam groups each including a plurality of the directional beams,
the control unit performing allocation of resources for reports of the scanning for the resetting from the apparatus at one time,
wherein the control unit performs the resetting in order of beam groups having a smaller number of the directional beams.

11. The communication apparatus according to claim 10, wherein the control unit notifies the apparatus of the allocation through communication using another component carrier.

12. The communication apparatus according to claim 10, wherein the control unit notifies the apparatus of the allocation through communication using another partial band of an identical component carrier.

13. The communication apparatus according to claim 10, wherein the control unit sets the allocation to be performed from a temporal position relative to a trigger of the resetting.

14. A communication apparatus comprising
circuitry configured to implement
a control unit that changes, for each of beam groups, setting of scanning for resetting communication with an apparatus, the communication being performed by using a directional beam, the scanning being performed by using the directional beam, the beam groups each including a plurality of the directional beams,
the control unit selecting, in the resetting, on a basis of a request from the apparatus, use of a beam group including a directional beam in a direction excluding a direction near the directional beam used for the communication with the apparatus before the resetting or use of a beam group including a directional beam in the direction near the directional beam used for the communication with the apparatus before the resetting.

15. The communication apparatus according to claim 14, wherein the control unit performs the resetting, on the basis of the request from the apparatus, by using the beam group including the directional beam in the direction excluding the direction near the directional beam used for the communication with the apparatus before the resetting.

16. The communication apparatus according to claim 14, wherein the control unit performs the resetting by using, in the resetting, further the beam group including the directional beam in the direction near the directional beam used for the communication with the apparatus before the resetting.

17. A communication apparatus comprising
circuitry configured to implement
a control unit that changes, for each of beam groups, setting of scanning for resetting communication from an apparatus, the communication being performed by using a directional beam, the scanning being performed by using the directional beam, the beam groups each including a plurality of the directional beams,
the control unit requesting the apparatus in the resetting to perform the resetting using a beam group including a directional beam in a direction excluding a direction near a directional beam used for communication with the apparatus before the resetting.

18. A communication apparatus comprising
circuitry configured to implement
a control unit that performs setting of scanning for resetting communication with an apparatus, the communication being performed by using a directional beam, the scanning being performed by using the directional beam,
the control unit performing, at one time, allocation of a resource to a beam group including a plurality of the directional beams and allocation of a resource for grasping a channel state of the communication performed by using the directional beam after the resetting.

19. The communication apparatus according to claim 18, wherein the control unit notifies the apparatus whether to perform only the scanning for the resetting, or perform scanning for grasping the channel state in addition to the scanning for the resetting.

20. The communication apparatus according to claim 18, wherein the channel state includes quality and an interference condition of the channel.

21. A communication method comprising changing, by a processor, for each of beam groups, setting of scanning for resetting communication with an apparatus, the communication being performed by using a directional beam, the scanning being performed by using the directional beam, the beam groups each including a plurality of the directional beams, the processor performing allocation of resources to the plurality of beam groups at one time, wherein the resetting is performed in order of beam groups having a smaller number of the directional beams.

22. A communication method comprising changing, by a processor, for each of beam groups, setting of scanning for resetting communication with an apparatus, the communication being performed by using a directional beam, the scanning being performed by using the directional beam, the beam groups each including a plurality of the directional beams, the processor performing allocation of resources for reports of the scanning for the resetting from the apparatus at one time, wherein the resetting is performed in order of beam groups having a smaller number of the directional beams.

23. A communication method comprising changing, by a processor, for each of beam groups, setting of scanning for resetting communication with an apparatus, the communication being performed by using a directional beam, the scanning being performed by using the directional beam, the beam groups each including a plurality of the directional beams, the processor selecting, in the resetting, on a basis of a request from the apparatus, use of a beam group including a directional beam in a direction excluding a direction near the directional beam used for the communication with the apparatus before the resetting or use of a beam group including a directional beam in the direction near the directional beam used for the communication with the apparatus before the resetting.

24. A communication method comprising changing, by a processor, for each of beam groups, setting of scanning for resetting communication from an apparatus, the communication being performed by using a directional beam, the scanning being performed by using the directional beam, the beam groups each including a plurality of the directional beams, the processor requesting the apparatus in the resetting to perform the resetting using a beam group including a directional beam in a direction excluding a direction near a directional beam used for communication with the apparatus before the resetting.

25. A communication method comprising performing, by a processor, setting of scanning for resetting communication with an apparatus, the communication being performed by using a directional beam, the scanning being performed by using the directional beam, the processor performing, at one time, allocation of a resource to a beam group including a plurality of the directional beams and allocation of a resource for grasping a channel state of the communication performed by using the directional beam after the resetting.

* * * * *